(12) United States Patent
Lawrence et al.

(10) Patent No.: US 11,724,876 B2
(45) Date of Patent: Aug. 15, 2023

(54) APPARATUS AND METHOD FOR AUTONOMOUS AGRICULTURE INVENTORY MANAGEMENT

(71) Applicant: RoBotany Ltd., Pittsburgh, PA (US)

(72) Inventors: Austin Blake Lawrence, Kalamazoo, MI (US); Loren Kristofor Russell, Los Osos, CA (US); Tim Morgan, Pittsburgh, PA (US); James Braxton Webb, Pittsburgh, PA (US); Edward Austin Webb, Aspinwall, PA (US)

(73) Assignee: Robotany Ltd., Pittsburgh, PA (US)

( * ) Notice: Subject to any disclaimer, the term of this patent is extended or adjusted under 35 U.S.C. 154(b) by 991 days.

(21) Appl. No.: 16/206,805

(22) Filed: Nov. 30, 2018

(65) Prior Publication Data
US 2019/0092567 A1    Mar. 28, 2019

Related U.S. Application Data

(63) Continuation-in-part of application No. 15/604,343, filed on May 24, 2017.
(Continued)

(51) Int. Cl.
*B65G 1/04* (2006.01)
*B65G 1/06* (2006.01)
(Continued)

(52) U.S. Cl.
CPC ........... *B65G 1/0407* (2013.01); *A01G 9/143* (2013.01); *B65G 1/026* (2013.01); *B65G 1/06* (2013.01); *B65G 1/12* (2013.01)

(58) Field of Classification Search
CPC ........ B65G 1/0407; B65G 1/026; B65G 1/06; B65G 1/12; A01G 9/143
See application file for complete search history.

(56) References Cited

U.S. PATENT DOCUMENTS

| 1,974,549 A | 9/1934 | Spencer et al. |
| 3,708,009 A | 1/1973 | Viol et al. |

(Continued)

FOREIGN PATENT DOCUMENTS

| CA | 2861881 | 8/2013 |
| CN | 100407896 | 6/2008 |

(Continued)

OTHER PUBLICATIONS

International Search Report and Written Opinion for International Patent Application No. PCT/US19/63298, dated Feb. 27, 2020.
(Continued)

*Primary Examiner* — Saul Rodriguez
*Assistant Examiner* — Ashley K Romano
(74) *Attorney, Agent, or Firm* — Reed Smith LLP

(57) ABSTRACT

Disclosed herein is an apparatus and method of autonomous Controlled Environment Agriculture (CEA) comprising a fully autonomous growing environment. More specifically, disclosed herein is an apparatus and method in which a plurality of frame assembly may be stored and manipulated within a track assembly that is configured within a rack through the motivational input a carriage-mounted manipulators. Each frame assembly is configured to be coupled to an adjacent frame assembly supported by the track assembly by at least one coupler disposed on a forward end and a rearward end of each frame assembly. With the frame assembly including a low friction bearing surface to orient within a track assembly, it may be configured to satisfy various utilities necessary within the farm, such as but not limited to the housing grow media for the cultivation or the housing of electromechanical systems.

15 Claims, 26 Drawing Sheets

Related U.S. Application Data

(60) Provisional application No. 62/340,952, filed on May 24, 2016.

(51) Int. Cl.
  B65G 1/02 (2006.01)
  B65G 1/12 (2006.01)
  A01G 9/14 (2006.01)

(56) References Cited

U.S. PATENT DOCUMENTS

| | | | |
|---|---|---|---|
| 3,888,041 | A | 6/1975 | Seith et al. |
| 4,163,342 | A | 8/1979 | Fogg et al. |
| 4,252,217 | A | 2/1981 | Benjamin |
| 4,309,844 | A | 1/1982 | King et al. |
| 4,543,026 | A | 9/1985 | Halonen et al. |
| 4,569,150 | A | 2/1986 | Carlson et al. |
| 4,640,459 | A | 2/1987 | Hetemaa et al. |
| 4,713,909 | A | 12/1987 | Roper et al. |
| 4,813,176 | A | 3/1989 | Takayasu |
| 4,965,962 | A | 10/1990 | Akagi |
| 5,253,745 | A | 10/1993 | Van Den Bergh |
| 5,445,485 | A | 8/1995 | Poutet |
| 5,632,214 | A | 5/1997 | Conley, Jr. et al. |
| 6,006,471 | A | 12/1999 | Sun |
| 6,061,957 | A | 5/2000 | Takashima |
| 6,070,368 | A | 6/2000 | Meikle et al. |
| 6,127,027 | A | 10/2000 | Nogami et al. |
| 6,223,463 | B1 | 5/2001 | Carlson et al. |
| 6,237,282 | B1 | 5/2001 | Pitts |
| 6,360,482 | B1 | 3/2002 | Boyes |
| 6,508,033 | B2 | 1/2003 | Hessel et al. |
| 6,561,125 | B1 | 5/2003 | Lohsomboon |
| 6,578,319 | B1 | 6/2003 | Cole et al. |
| 6,694,894 | B1 | 2/2004 | Darnell |
| 6,807,770 | B2 | 10/2004 | Wainwright et al. |
| 6,814,279 | B2 | 11/2004 | Jochens |
| 8,026,027 | B2 | 9/2011 | Morales-Ramos et al. |
| 8,083,448 | B2 | 12/2011 | Heinrichs et al. |
| 8,468,741 | B2 | 6/2013 | Lewis |
| 8,627,598 | B1 | 1/2014 | Souder et al. |
| 8,672,148 | B2 | 3/2014 | Krummel et al. |
| 8,782,948 | B2 | 7/2014 | Harwood et al. |
| 8,809,037 | B2 | 8/2014 | Haley, III |
| 8,847,514 | B1 | 9/2014 | Reynoso et al. |
| 9,394,208 | B2 | 7/2016 | Caro |
| 9,428,336 | B2 * | 8/2016 | Hagen ............... G07F 11/1657 |
| 9,474,217 | B2 | 10/2016 | Anderson et al. |
| 9,510,524 | B2 | 12/2016 | Anderson et al. |
| 9,520,012 | B2 * | 12/2016 | Stiernagle ............. G07F 9/0235 |
| 9,790,028 | B2 * | 10/2017 | Stiernagle ............. B65G 1/0457 |
| 9,821,464 | B2 * | 11/2017 | Stiernagle ............. G07F 11/165 |
| 10,339,514 | B2 * | 7/2019 | Natarajan ............ H04W 12/084 |
| 10,526,142 | B2 * | 1/2020 | Jin ........................ G06Q 10/087 |
| 10,604,344 | B2 * | 3/2020 | Testa .................... B65G 1/0407 |
| 10,697,987 | B2 * | 6/2020 | Neeper ................... B65G 1/00 |
| 11,097,897 | B1 * | 8/2021 | Theobald ............. B65G 1/0492 |
| 2003/0188477 | A1 | 10/2003 | Pasternak et al. |
| 2005/0120983 | A1 | 6/2005 | Vadis |
| 2005/0132937 | A1 | 6/2005 | Branam |
| 2006/0045674 | A1 | 3/2006 | Craven |
| 2006/0266292 | A1 | 11/2006 | Duckworth |
| 2007/0172396 | A1 | 7/2007 | Neeper et al. |
| 2011/0232186 | A1 | 9/2011 | Lewis |
| 2011/0296756 | A1 | 12/2011 | Zhang |
| 2013/0019527 | A1 | 1/2013 | Howe-Sylvain |
| 2014/0017043 | A1 * | 1/2014 | Hirai ..................... A01G 9/143 414/267 |
| 2014/0137471 | A1 | 5/2014 | Harwood et al. |
| 2014/0144078 | A1 | 5/2014 | Gonyer et al. |
| 2014/0324490 | A1 | 10/2014 | Gurin |
| 2015/0107154 | A1 * | 4/2015 | Visser ..................... A01G 9/26 47/66.6 |
| 2015/0223491 | A1 | 8/2015 | Frampton et al. |
| 2015/0282437 | A1 | 10/2015 | Ohara et al. |
| 2015/0374005 | A1 | 12/2015 | Arsiwalla et al. |
| 2016/0135364 | A1 | 5/2016 | Souder et al. |
| 2016/0221714 | A1 | 8/2016 | Liao et al. |
| 2016/0236815 | A1 | 8/2016 | Liao et al. |
| 2017/0174431 | A1 | 6/2017 | Borders et al. |
| 2017/0339846 | A1 | 11/2017 | Lawrence et al. |
| 2018/0290830 | A1 | 10/2018 | Valinsky et al. |
| 2019/0092567 | A1 | 3/2019 | Lawrence et al. |

FOREIGN PATENT DOCUMENTS

| | | |
|---|---|---|
| DE | 3404300 | 8/1985 |
| EP | 0126431 | 11/1984 |
| EP | 0287912 | 10/1988 |
| EP | 0391071 | 10/1990 |
| EP | 0512791 | 11/1992 |
| EP | 0869084 | 6/2003 |
| EP | 1614643 | 1/2006 |
| ES | 2137021 | 10/2004 |
| JP | 2005306500 | 11/2005 |
| JP | 2012210155 | 11/2012 |
| JP | 2014064522 | 4/2014 |
| WO | 1997047526 | 12/1997 |
| WO | 2014081663 | 5/2014 |
| WO | 2015105426 | 1/2015 |
| WO | 2015079194 | 5/2015 |
| WO | 2015082924 | 6/2015 |
| WO | 2015105248 | 7/2015 |
| WO | 2015134033 | 9/2015 |
| WO | 2015152206 | 10/2015 |
| WO | 2016153338 | 9/2016 |

OTHER PUBLICATIONS

Informal Comments to the International Bureau of WIPO for International Patent Application No. PCT/US19/63298, dated Apr. 27, 2020.
International Search Report and Written Opinion for corresponding International Application No. PCT/US17/34297 dated Oct. 5, 2017.
International Preliminary Search Report for corresponding International Application No. PCT/US17/34297 dated Nov. 27, 2018.
International Search Report for corresponding European Application No. EP19889342 dated Jul. 28, 2022.
Search Report and Written Opinion for European Application No. EP17803519.2 dated Nov. 26, 2020.
Search Report and Written Opinion for European Application No. EP17803519.2 dated Nov. 12, 2019.

* cited by examiner

APPARATUS AND METHOD FOR AUTONOMOUS AGRICULTURE INVENTORY MANAGEMENT

CROSS-REFERENCE TO RELATED APPLICATIONS

This patent application is a continuation-in-part of U.S. patent application Ser. No. 15/604,343, filed on May 24, 2017 which claims priority to U.S. Provisional Patent Application Ser. No. 62/340,952, filed on May 24, 2016, all of which are herein incorporated by reference in their entirety.

FIELD OF THE INVENTION

The present disclosure relates to an apparatus and method for autonomous Controlled Environment Agriculture (CEA), including without limitation for the purpose of cultivation of organic produce and other organic or natural products and in vertical farming applications. The disclosed apparatus and method can also be utilized for more general application in the fields of agriculture, material handling, and warehousing, including without limitation, modular pallet warehousing.

BACKGROUND OF THE INVENTION

Controlled Environment Agriculture (CEA) is an evolving technique for the precision cultivation of organic produce through the artificial control of influential environmental factors. An appeal to facilitate the desirable outcomes of growth, this type agriculture may require the regulation of parameters pertaining to atmospheric, nutritional, spatial, or electromagnetic qualities. In doing so, a precise understanding of an organic system's overall production with respect to time is much more attainable. Systems like these can vary in size, ranging from a household appliance, to a standard freight shipping container, to a 10,000 square-meter warehouse, to a multi-hectare greenhouse. CEA systems are typically equipped with a general selection of actuators and sensors to monitor and control the environment.

In recent times, the technique has seen market potential in the cultivation of leafy or herbal produce, but the method has historically also suited for other organic applications, such as production of ornamentals, fungi, simple organisms, and protein sources. CEA offers the appeal of being resistant to growth-inhibiting factors, such as droughts, Famine, floods, or winters. Because of this resiliency, consistent, year-round production is possible for a wide range of geographic scenarios, including urban, desert, artic, and deep space regions.

Typically, CEA systems running at a commercial capacity require a wide range of manual tasks to be performed by farmhands on a daily basis. These responsibilities may include the harvesting, cleaning, creation, inspection, and moving of product, the maintenance, sensing, control, and logistical planning of the environment, and the analysis of any data that may be subsequently collected. Despite being computer-controlled and with sensory feedback, CEA systems have many logistical points of failure that require technical skills from the farmhands in order to maintain. Appropriately so, commercial CEA systems are sometimes referred to as "plant factories" for their resemblances to manufacturing environments.

In industries pertinent to the distribution of inventory, autonomous warehousing has grown to prominence with the notion of a distributed robotic network to satisfy the last-mile issue that is often faced within large centers. In the 1970's, Autonomous Storage and Retrieval (ASRS) systems rose to prominence and were complimented with general conveyance of varying complexity to create semi-autonomous zones within the warehouse through the use of a manual crane operator. Over decades of innovation, fully autonomous warehousing has seen continued interest due to improved accessibility of affordable, functional robotic resources, such as actuators, sensors, embedded hardware, and control algorithms. New embodiments and methods include a fleet of freely-driven robots within a warehouse that have created further evolution in automation, now looking towards topics of dextrous manipulation, rich image classification, and swarm optimization.

Despite the prevalence in autonomous mechanization that has benefitted warehousing, few solutions exist that are appropriate for CEA embodiments. Tasks in CEA systems are largely manual, requiring redundant work from human laborers. These tasks, often worsened by day-long repetition, excessive amounts of walking, and the frequent use of vertical lifts, all attribute to a significant portion of operational expenses for a CEA. As reported in Newbean Capital's 2015 white paper, "Robotics and Automation in Indoor Agriculture," CEAs in the vegetative green industry spend about 26% of their operational expenses on human labor, second to electricity at 28%. Because a significant portion of resources are dedicated to accessing manual labor, it is difficult for CEA operators to justify committing even more resources to the meticulous capture and logging of data. A consequence to this, optimization suffers, and little may be done to reduce operating expenses in areas such as electrical, nutritional, and water usages.

A growing number of specialized systems have been proposed in the interest of improving the operation of CEA systems. For example, Just Greens' US2014/0137471 embodiment employs the use of a fabric-like material of particular absorptive and wicking parameters that may be mounted onto a variety of tensioning and conveying systems, but is best suited for aeroponic environments where suspended roots are given adequate clearance to grow. As another example, Living Greens Farm's U.S. Pat. No. 9,474, 217B2 embodiment contains a mobile track system for large A-frames containing plants to transverse along, as well as a mobile irrigation system, but it does not offer irrigation methods differentiated from aeroponics. Lastly, Urban Crop Solutions' WO2017012644(A1) describes an industrial plant growing facility, but limits scope to the cultivation only of green produce within flat, off-the-shelf trays. No standardization exists which offers broad versatility and inspection in a CEA environment for varying applications.

As these mentioned embodiments do bring improvements to CEA in practice, their function is often very specific to the type of produce that is being cultivated and would require substantial capital investment to convert infrastructure for alternative forms of agriculture. In addition, some embodiments make frequent requirement for workers to operate in precarious situations that may involve carrying a large, potentially wet, cumbersome pallet of produce on ladders or scissor lifts. Lastly, all of these inventions do not facilitate the measurement of produce quality at a particular site of production without first requiring substantial manipulation from a human, or automated mechanism, to deliver the organic material of interest to a stationary sensory station.

Embodiments disclosed within contemplate an apparatus and method for autonomous inventory management for applications particular to CEA. The system, generally consisting of a plurality of tray assemblies (40) configured linearly within a plurality of track assemblies (18) within a rack (11) within an environmentally-controlled environment, may receive autonomous forceful input from a carriage-mounted manipulator (79) to add, subtract, index, or transfer tray assemblies (40) within the growing environment (10).

The template frame (41), having features for compressive or tensile input along a serial chain of the like, orients onto a pair of tracks (19) of at least one track assembly (18) with low-friction bearing surfaces that are affixed to the template frame (41). A tag (47), consisting of an RFID chip or optical feature, allows for tracking from an inventory management system. Fasteners (44) on the template frame (41) accept a frame insert (50) derivation that is pertinent to the particular CEA application of interest. An indexing face (49) for the forceful input and manipulation from a carriage-mounted manipulator (79) allow the autonomous handling of product.

The frame insert (50), having mating features for orienting and affixing to the fasteners (44) on a template frame (41), may be configured for a variety of scenarios that are pertinent to the particular CEA task. For example, one embodiment of a frame insert (50) may include a rigid frame (51) along with tensioned fabric (52) principally intended as a growing media for short, leafy or herbal produce. In another embodiment, the frame insert (50) may include an electronic enclosure (73) to facilitate tasks such computation, energy generation and storage, wireless communication, controls, and sensing. Additional embodiments of the frame insert (50) may be configured for applications that are largely pertinent to CEA organic product, such as ornamental crops, medicinal crops, plants requiring anchoring at the base, vines, fungi, roots, simple organisms, carbohydrates, fats, and protein sources.

The track (19), having a plurality of flats that are parallel to the horizon, facilitates linear motion by providing at least one low-friction bearing (46) on a template frame (41) to commute. In an embodiment, two tracks (19) are oriented to be mirrored about a center plane perpendicular to the horizon within the rack (11) and do not provide a significant contribution to the structural integrity of the structure. In alternative derivations, the track (19) may be configured with multiple steps for additional mobile bodies to linearly move independently of one another, features for the confinement of mobile bodies, features for electrical or fluidic channels, or features for mounting hardware, such as bearings brackets or sensors.

The track (19) may be configured as a track assembly (18) to achieve various functions pertinent to a specialized CEA system. For example, an embodiment illustrated herein contemplates an aeroponic configuration in which a flexible sheet (20) is formed and affixed to fit between a hat (16) and track (19). Supporting hardware, such as aeroponic modules (29), a fluidic drain (27), a fluidic inlet (28), and at least two bulkheads (22) and stiffeners (23) are incorporated into said track assembly (18) embodiment. In another embodiment, a low pressure fluidic system (37) may be derived consisting of a flexible sheet (20) to function as a channel for waste fluids, a fluidic drain (27) and inlet (28), and fluidic emitters (36) to deliver a chemical solution to tray assemblies (40). In exemplary embodiments, a track assembly (18) may be configured for applications relevant to the production of ornamentals crops, medicinal crops, plants requiring anchoring at the base, vines, fungi, roots, simple organisms, carbohydrates, fats, and protein sources.

In accordance with CEA system design, the apparatus may include peripherals to assist in regulating environmental parameters. A fertigation system may use a combination of pumps, solenoids, filters, chemical reservoirs, and sensors to regulate and distribute a fluid of nutritional significance throughout the growing environment (10) and more directly to tray assemblies (40). A light (33) can be used to provide supplemental light to living organisms, preferably through color and intensity-specified LED modules, and facilitate desirable growth on each tray assembly (40). Fans (30) may be included to ensure proper mixing of gasses, to improve thermal distribution, and to redirect undesired moisture away from plant canopies. In continuation of said embodiment and common knowledge, the apparatus is confined within an environmentally-controlled enclosure and is equipped with an air quality unit for the monitoring and regulation of atmospheric parameters within the grow environment (10). These parameters may include the active control of relative humidity, temperature, particulate frequency and size through mechanical filtration, pathogen through UV treatment, and carbon dioxide supplementation. Contents within the enclosure are physically isolated from an outside environment and undergo a minimal number of air exchanges, thus satisfying the function as a CEA system. Enclosure embodiments may fit the form factor found in industrial warehousing, shipping containers, and greenhouses while still benefitting from the embodiment of this invention.

Exemplary embodiments are generally pertinent to the apparatus and method of autonomous inventory management in CEA systems through the active input of one or more carriage-mounted manipulators (79). In one embodiment, which is described in this document with the intent for illustration, an automated inventory management system is described for environments relevant to the cultivation of leafy or herbal produce inside facilities that are configured over multiple layers of plants grown within tray assemblies (40). In function, the manipulator (82) may navigate to a first location of interest, extend its linear extensor (87) and perform a grasping maneuverer by closing its clamps (86), forcibly push tray assemblies (40) configured within a track assembly (18), and insert said tray assembly (40) into a new respective location within a track assembly (18) within a rack (11), or processing line. In the embodiment, the manipulator (82) may perform retrieval, indexing, and insertion functions to tray assemblies (40) within the growing environment (10), and may optionally operate tray assemblies (40) to or from a processing line.

Additional embodiments contemplate a system providing last-in-first-out (LIFO) inventory management.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
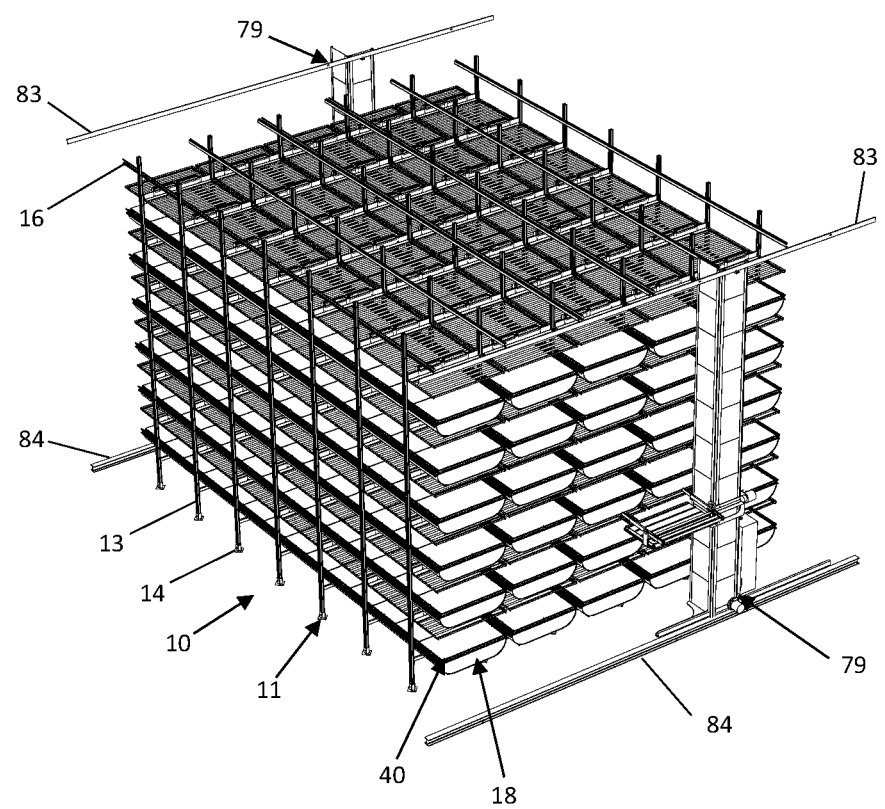
FIG. 1 shows an overall apparatus of autonomous controlled environment agriculture according to the embodiment of the invention as a grow environment.
Figure 2:
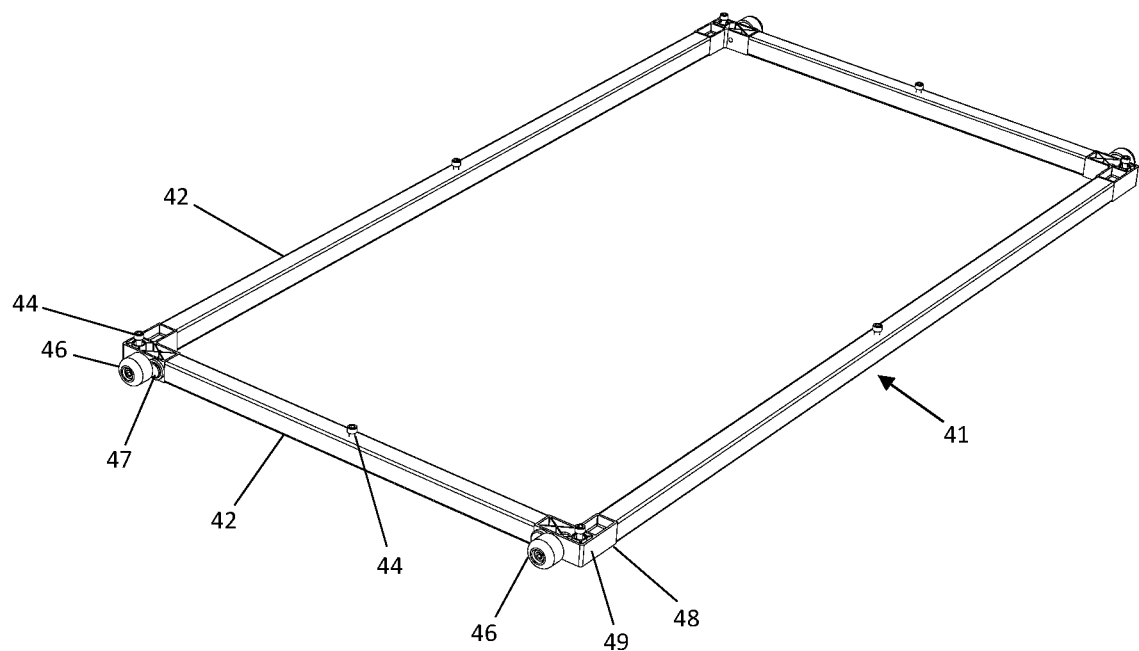
FIG. 2 shows an embodiment of the template frame.
Figure 3:
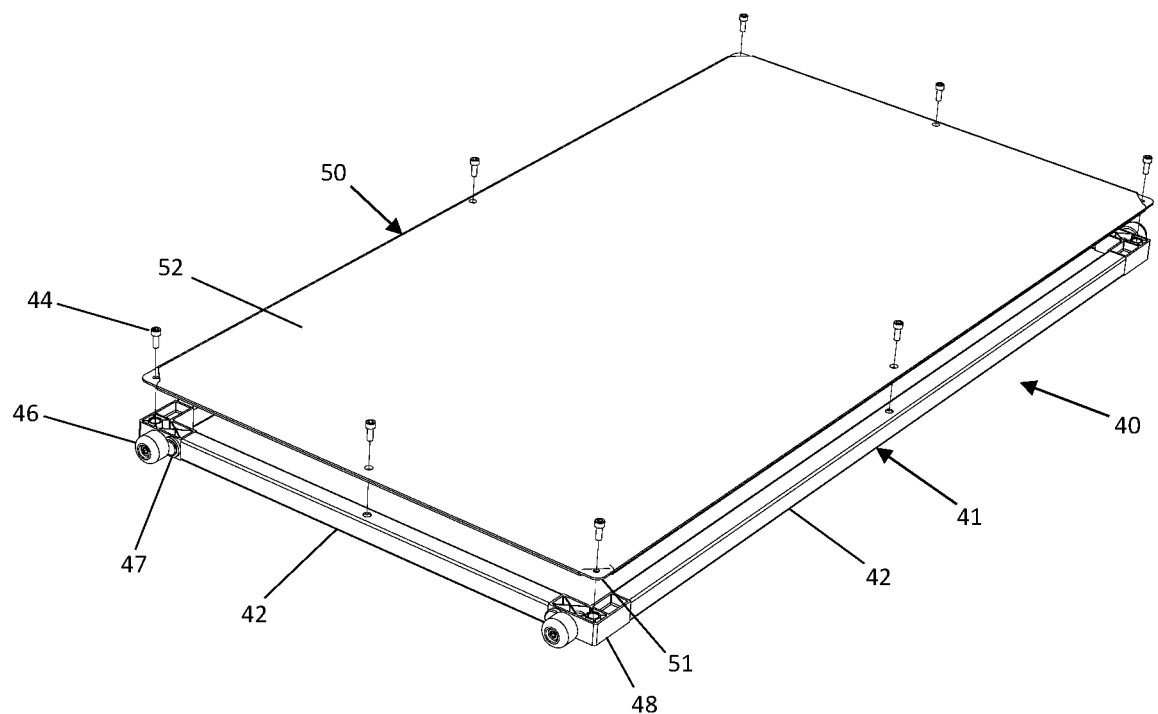
FIG. 3 shows one embodiment of a tray assembly having a fabric frame insert.
Figure 4:
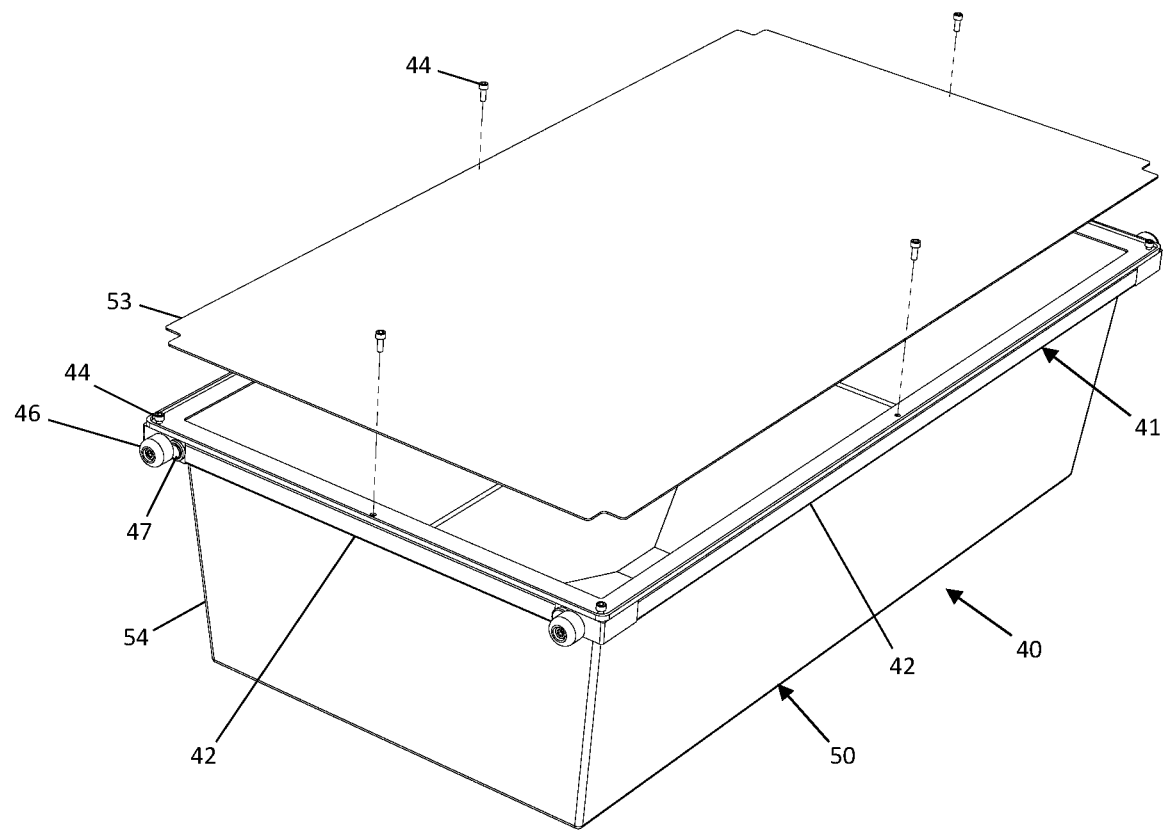
FIG. 4 shows one embodiment of a tray assembly having a deep bin frame insert.
Figure 13:
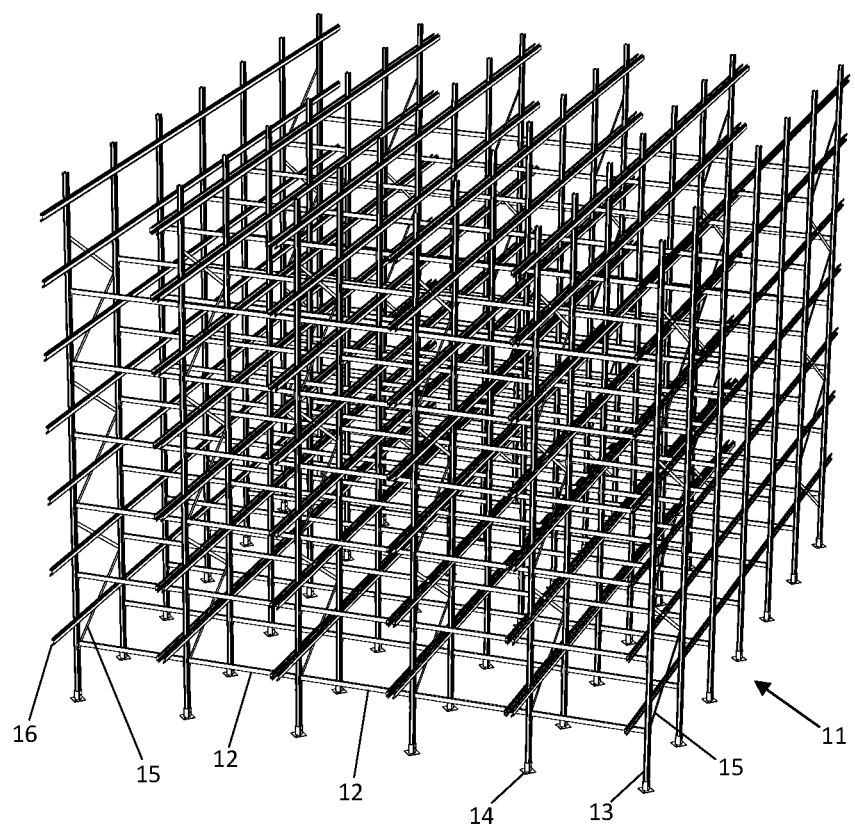
FIG. 13 shows one embodiment of a rack with walkways.
Figure 14:
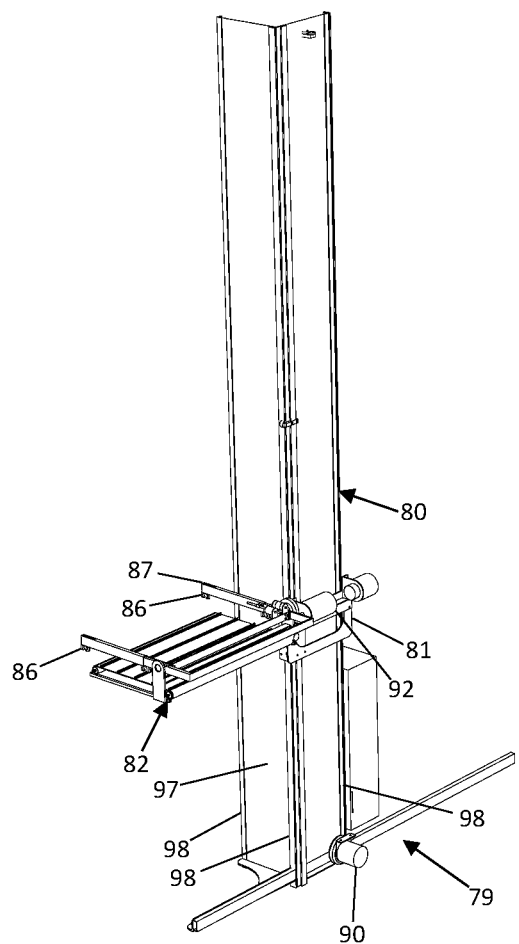
FIG. 14 shows an embodiment of a carriage-mounted manipulator.
Figure 15:
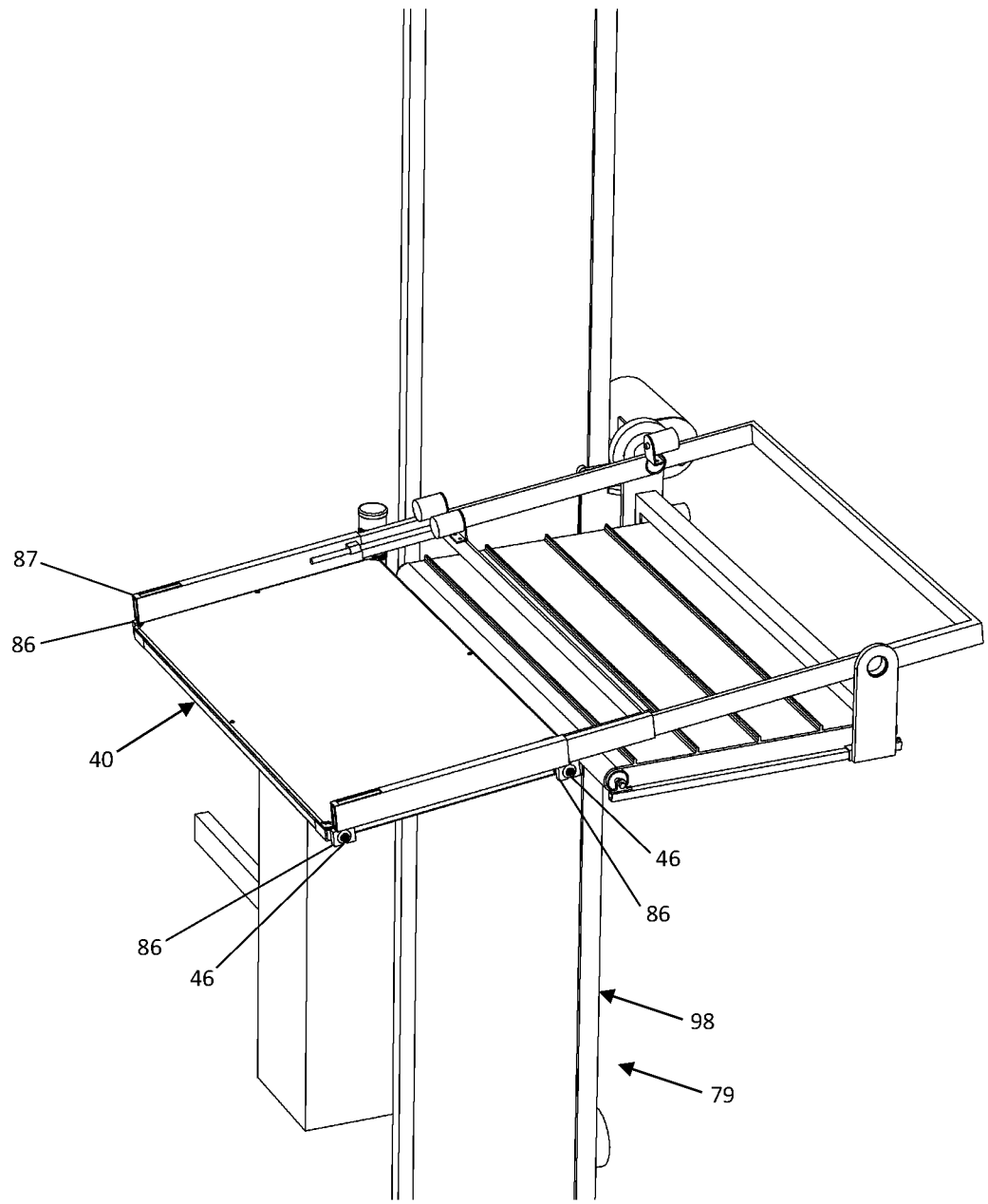
FIG. 15 shows an interaction of a carriage-mounted manipulator and a tray assembly.
Figure 16:
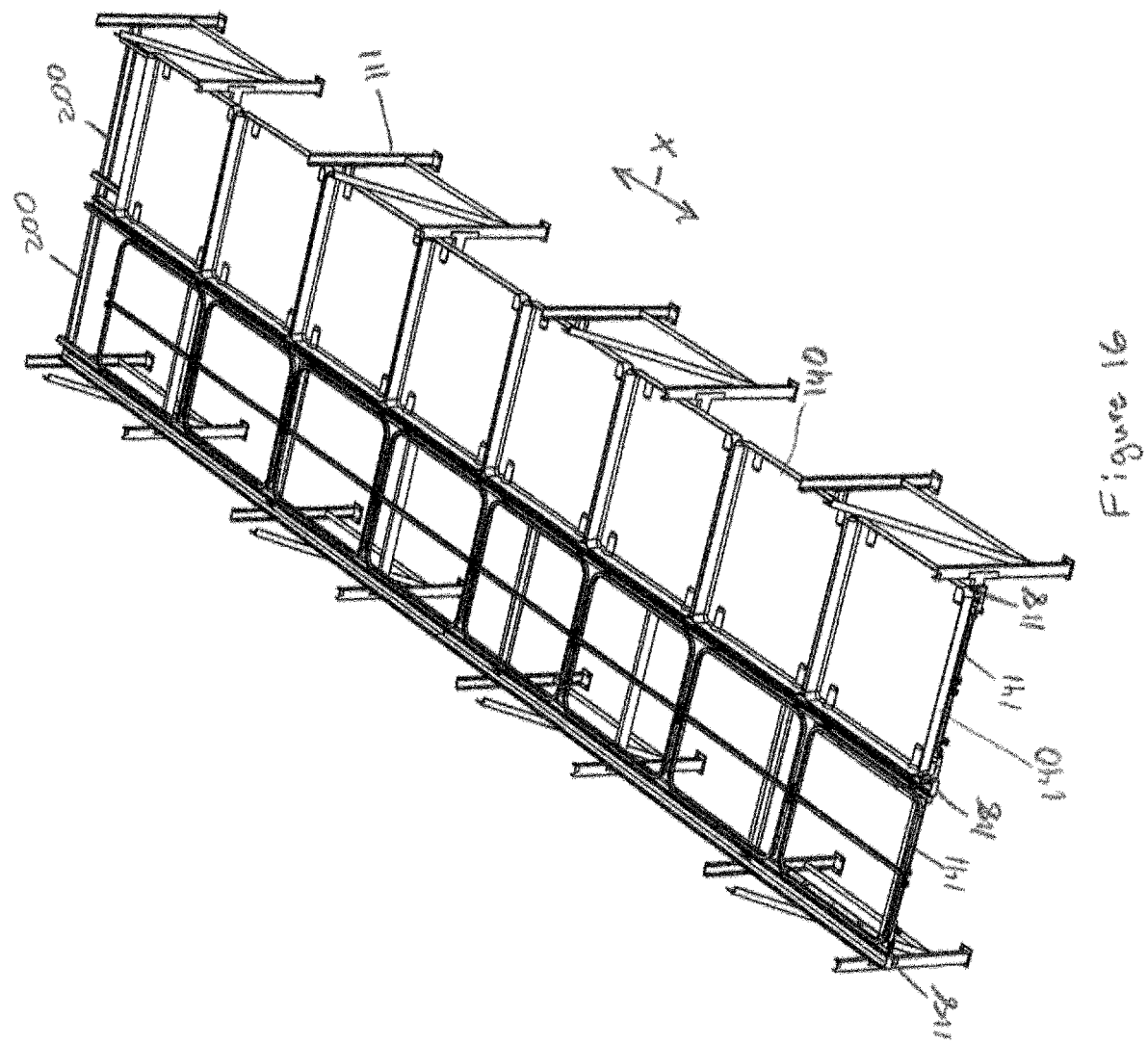
FIG. 16 shows a perspective view of interlocked tray assemblies within track assemblies of a rack according to another embodiment.
Figure 17:
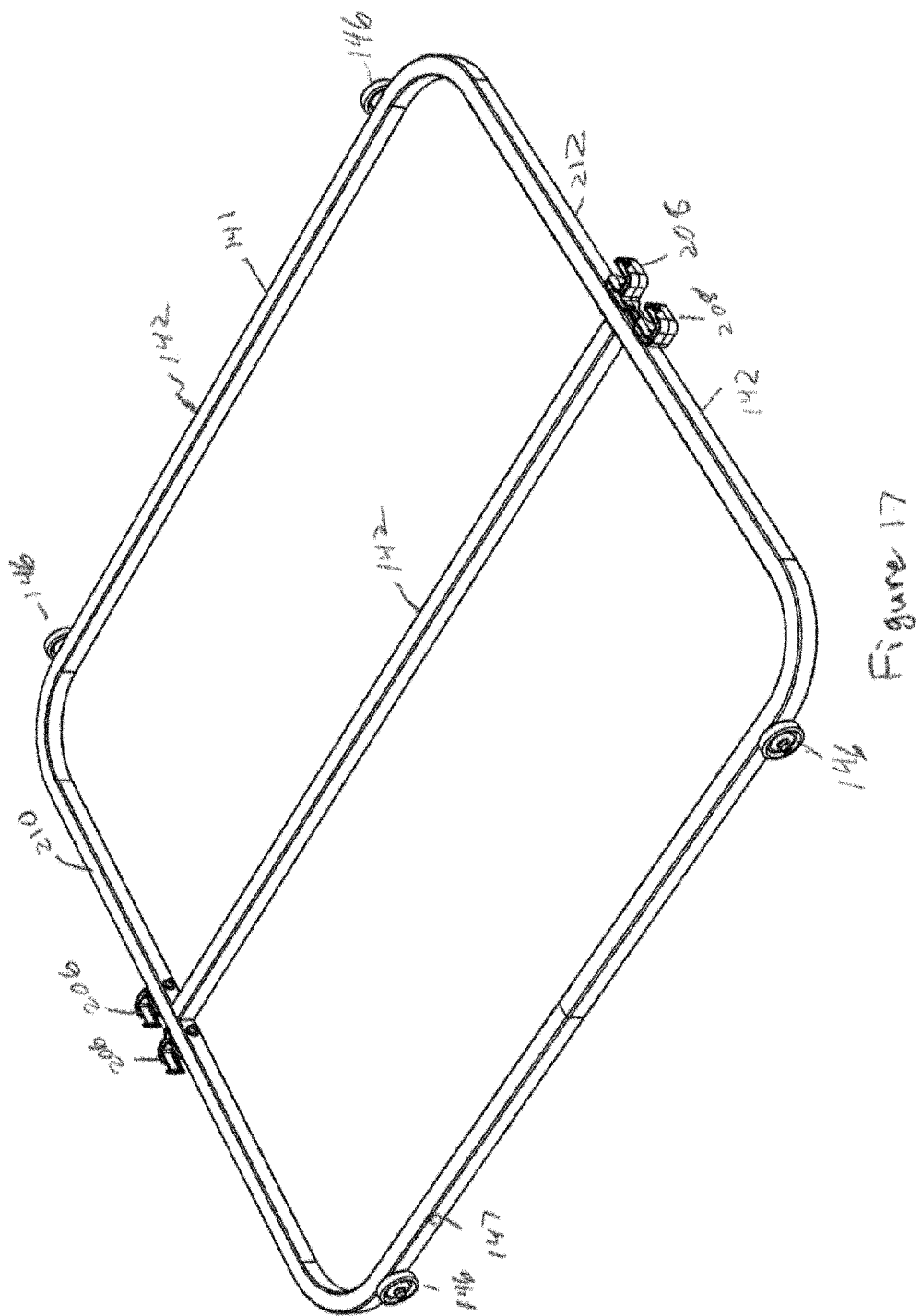
FIG. 17 shows a perspective view of a frame assembly according to the embodiment of FIG. 16.
Figure 18:
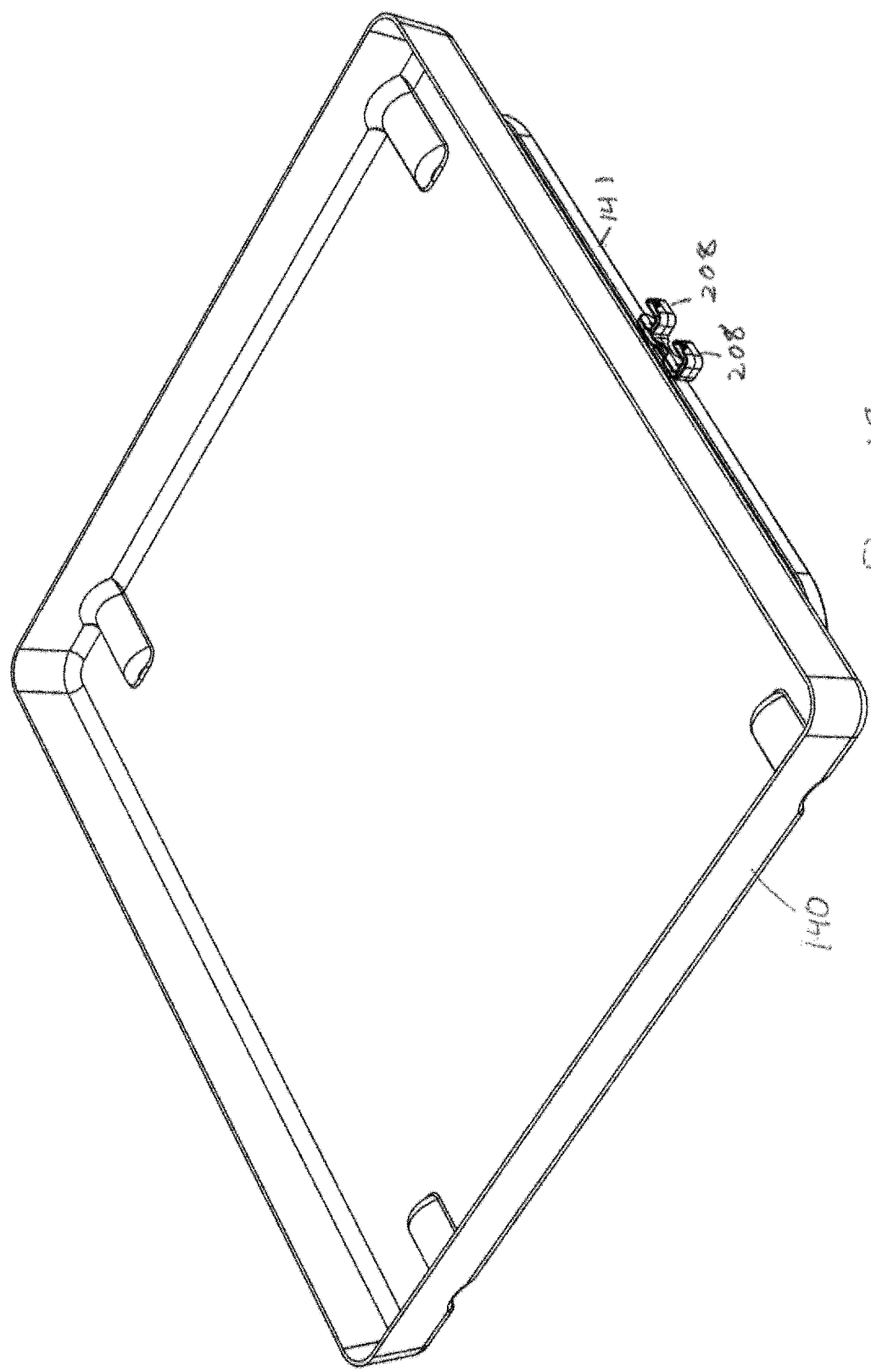
FIG. 18 shows a perspective view of a tray assembly according to the embodiment of FIG. 16.

One embodiment of the present invention, as depicted in FIG. 1, comprises a carriage-mounted manipulator (79), consisting of a carriage (80) which is further shown in an embodiment in FIGS. 14 and 15, and a manipulator (82) which is further shown in preferred embodiments in FIGS. 1, 14, and 15 as being affixed to said carriage (80) through fastening to a mounting bracket (81). Further detail of the embodiment consists of a rack (11) which is further shown in an embodiment in FIGS. 1, 11, 12, and 13, a track assembly (18) which are further shown in an embodiments in FIGS. 1, 8, 9 and 10, and tray assembly (40) comprising of a template frame (41) and frame insert (50), assuming a variety of utilities and embodiments demonstrated in FIGS. 3, 4, 5, 6, and 7, such as housing plant grow media for the cultivation of produce, a bin for retaining organic material, or a wireless sensory and actuation hub. The manipulator (82) may push or pull a tray assembly (40) through the forceful contact, or alternatively retrieve said tray assembly (40) through a multitude of grasping techniques, such as through the use of a clamp (86) directly to at least two wheels (46) mounted to the template frame (41). Tags (47) on a rack (11) and the tray assembly (40) may assist the manipulator (82) and carriage (80) in localization and may also serve the function of tracking. As one manipulator (82) indexes a tray assembly (40), an antagonistic manipulator (82) may retrieve a tray assembly (40) to provide linear clearance along the track assembly (18). A multitude of tray assembly (40) and track assembly (18) derivations may be incorporated into a rack (11), offering sensory, sterilization, and actuation resources in addition to methods and apparatuses for the cultivation of produce.

As alluded to in the background section, vertical farms are burdened with human labored tasks. In incorporating a manipulator (82) with the wide range of functions possible by the template frame (41), laborious tasks, such as handling tray assemblies (40), sterilization, sensing, and data logging may be completely automated by machines along a processing line. Doing so reduces the need for human intervention in the growing environment (10), thus advancing towards autonomous controlled environment agriculture.

In another embodiment, as shown in FIG. 1, the rack (11) is configured to provide attachment sites to the track assembly (18), linear guides (83 and 84) for the carriage (80), and horticultural lights (33). The track assembly (18) bears directly onto the rack runner (12), where load may be transmitted through the rack verticals (13), distributed through the foot pads (14) and onto a sturdy floor. Though the rack (11) in FIGS. 1, 11-13 describe track assemblies (18) at six levels high, the rack (11) may conceivably be any number of track assemblies (18) wide, at any length, at any number of layers high. Should hallways (17) for human access be required, the linear guides (83 and 84) may be extended across at heights that are unobtrusive for a human to navigate around. Brackets (15) are used to provide stiffness to the rack (11) shown in FIG. 1, 11-13. Plumbing for drains (27) and pressurized lines may be routed within the proximity of the rack verticals (13).

As the linear guides (83 and 84) are located at opposite ends of the rack (11) shown in FIG. 1, the carriage-manipulator (79) shown in FIGS. 1, 14, and 15 may freely navigate along the width of the rack (11) while still having access to the tray assemblies (40) derived in FIGS. 2-7. The carriage (80), shown in FIGS. 1, 14, and 15, provides vertical linear motion via its linear guides (98) and drive motor (91). Other forms of linear actuation, such as friction roller, lead screw, scissor mechanism, or fluidic actuator may also be suitable. The carriage vertical (97) provides structure to the overall integrity of the carriage (80) shown in FIGS. 1, 14, and 15. Bearings may be tensioned to fit securely onto the linear guides (98). The carriage (80) may store electronics, hyperspectral cameras, or sensors for querying the tray assembly (40). In alternative derivations, the motor (90) controlling motion along the linear guides (83 and 84) may be housed remote of the carriage (80) in FIGS. 1, 14, and 15.

In another embodiment, the manipulator (82), shown in FIGS. 1, 14, and 15, is intended to manipulate the tray assembly (40), shown in FIGS. 3-7, through a mode of actuation. The stiffeners (42 and 43) are bonded together with brackets (48). Bearings provide controlled linear motion about the linear extensor (87). A motor (92) provides power to the linear extensor (87). In alternative derivations, the linear extension function could be accomplished through fluidic actuation, a lead screw, linkage, or magnetic suspension.

As shown FIG. 15, to acquire a template frame (41) in one embodiment, the linear extensor (87) is oriented directly over the top surface of the template frame. To place a template frame (41) back into the rack (11), the manipulator (82) shown in FIG. 15 is oriented in front of a cutout feature of the track assembly (18), and extended through the actuation input of the motor (92). The indexing face (49) comes into contact with the indexing face (49) of another template frame (41), and continues to exert force until the template frames (41) within the track assembly (18) have indexed one full template frame (41) width.

Figure 5:
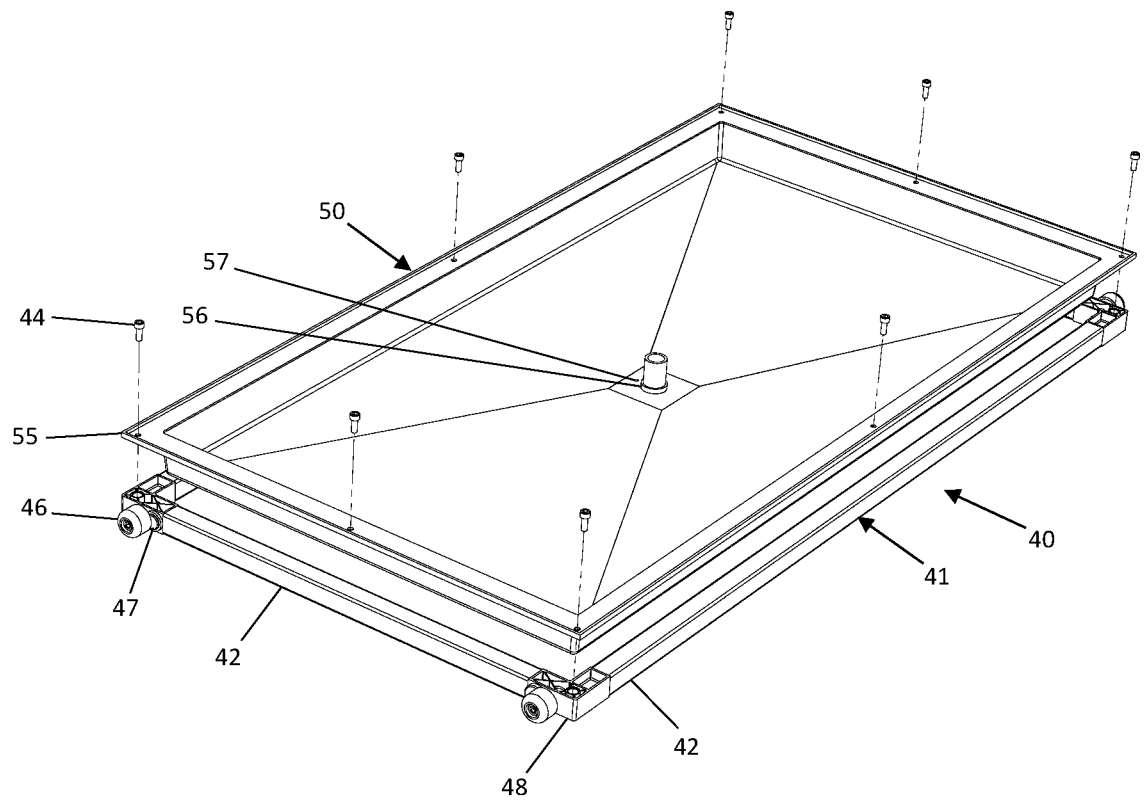
FIG. 5 shows one embodiment of a tray assembly having a shallow bin frame insert.
Figure 6:
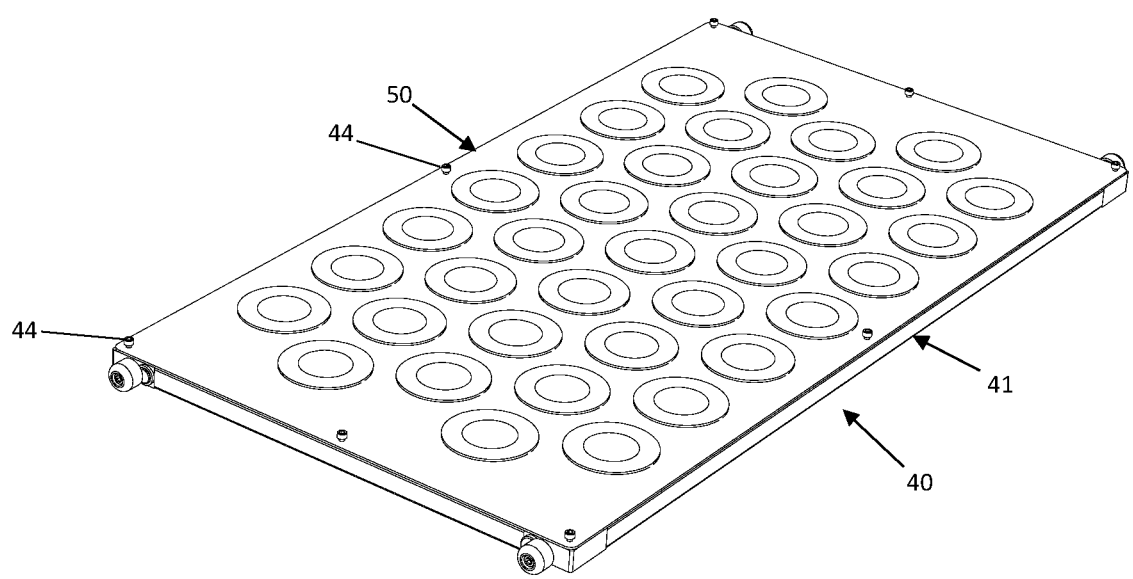
FIG. 6 shows one embodiment of a tray assembly having a net pot frame insert.
Figure 8:
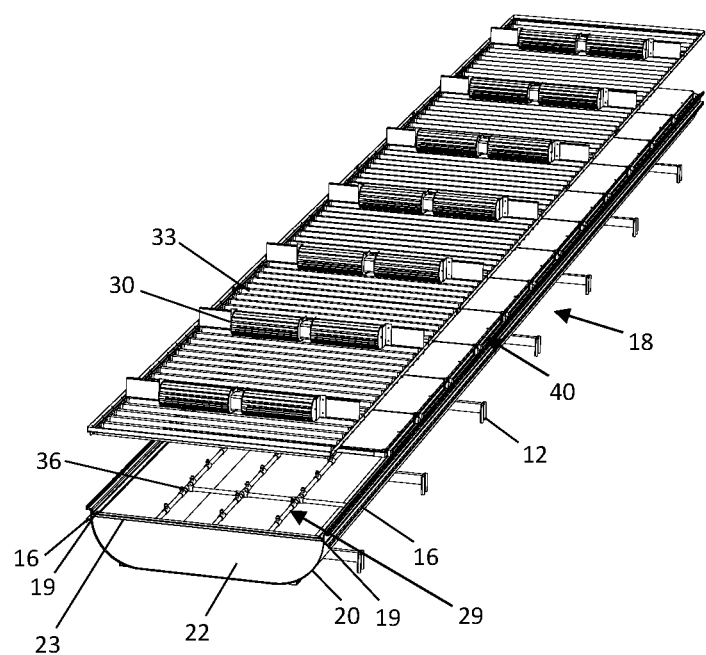
FIG. 8 shows one embodiment of a track assembly configured for high-pressure irrigation.
Figure 9:
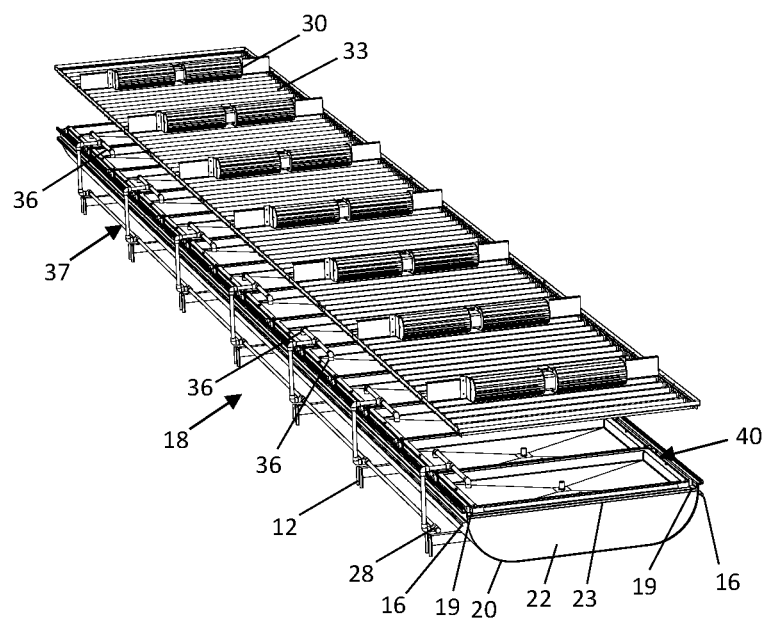
FIG. 9 shows one embodiment of a track assembly configured for low-pressure irrigation.
Figure 10:
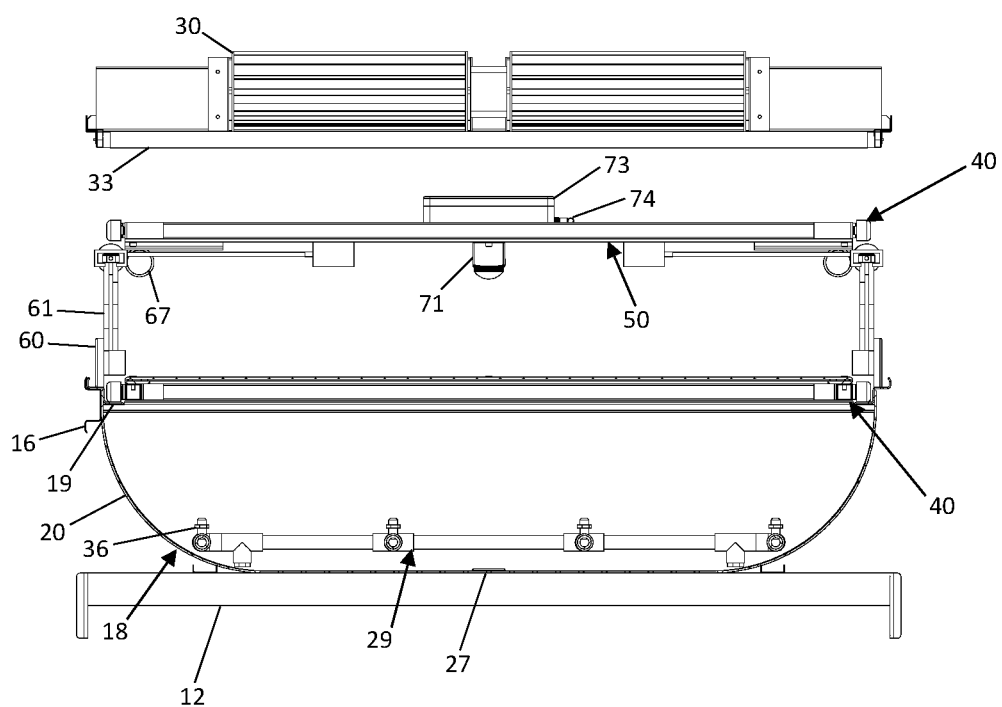
FIG. 10 shows a profile view of one embodiment of a track assembly configured for high-pressure irrigation.
Figure 11:
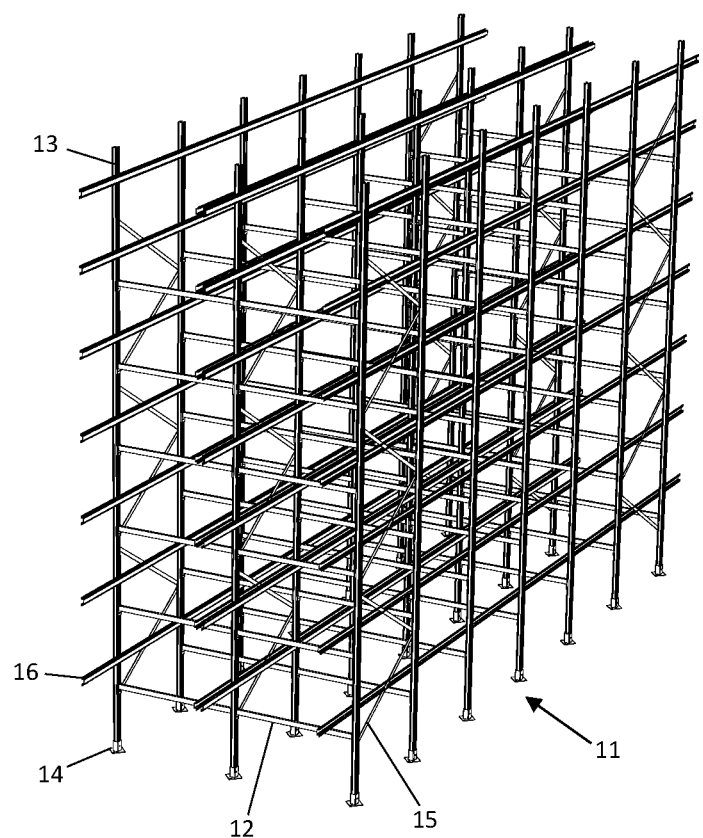
FIG. 11 shows one embodiment of a rack.
Figure 12:
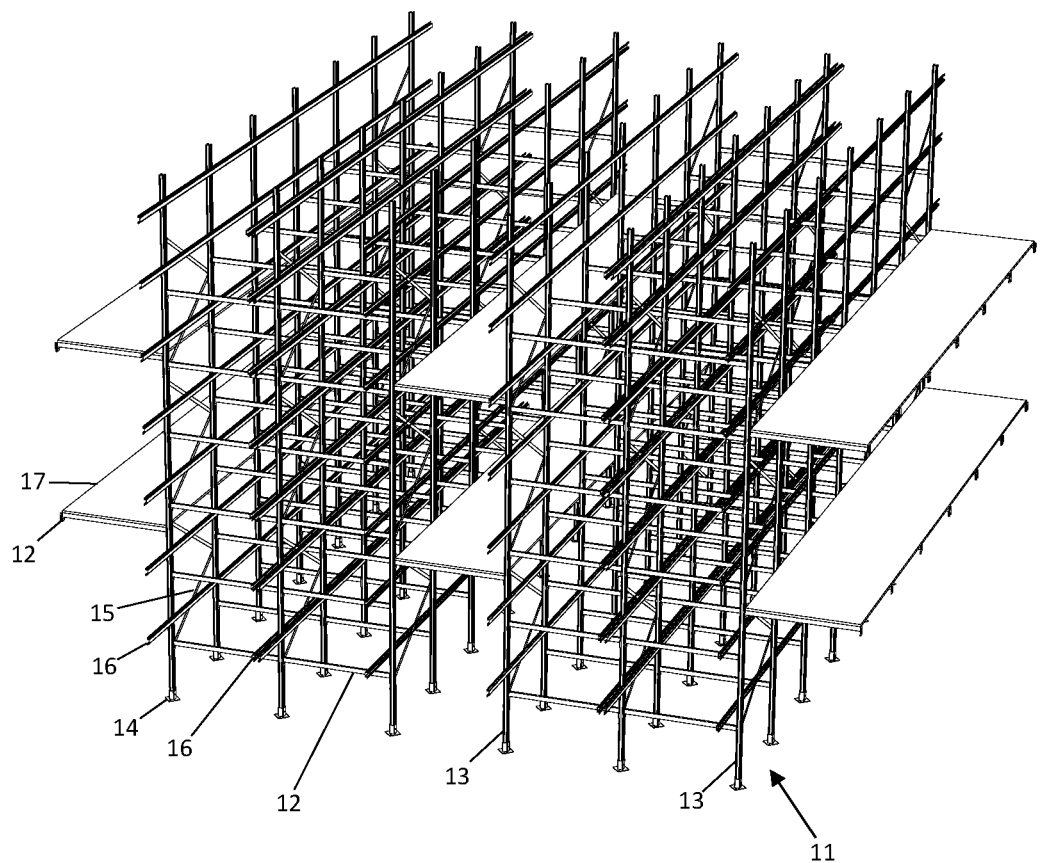
FIG. 12 shows one embodiment of a rack.

In one embodiment, as shown in FIGS. 5, 8, and 9, the track assembly (18) resides within the rack (11) expressed in FIGS. 11-13, and houses template frames (41) and plumbing. The track (19) bears features for securing template frames (41) and mitigating risk for buckling. In FIG. 10, the track (19) has a two-sided feature to allow for the manipulator (82), in FIGS. 1, 14, and 15, to access the template frames (41). The track assembly (18) bears a flange feature for bearing onto rack runner (12), and a small pitch to motivate water drainage towards its center. An overflow drain (56) assures no risk for water to flood the track assembly (18) in FIG. 9, whereas a drain (57) provides a smaller orifice for water to fully evacuate the tray assembly (40). The bulkhead (22) retains water, and bears a cutout feature for the manipulator (82) to engage the template frame (41).

Figure 7:
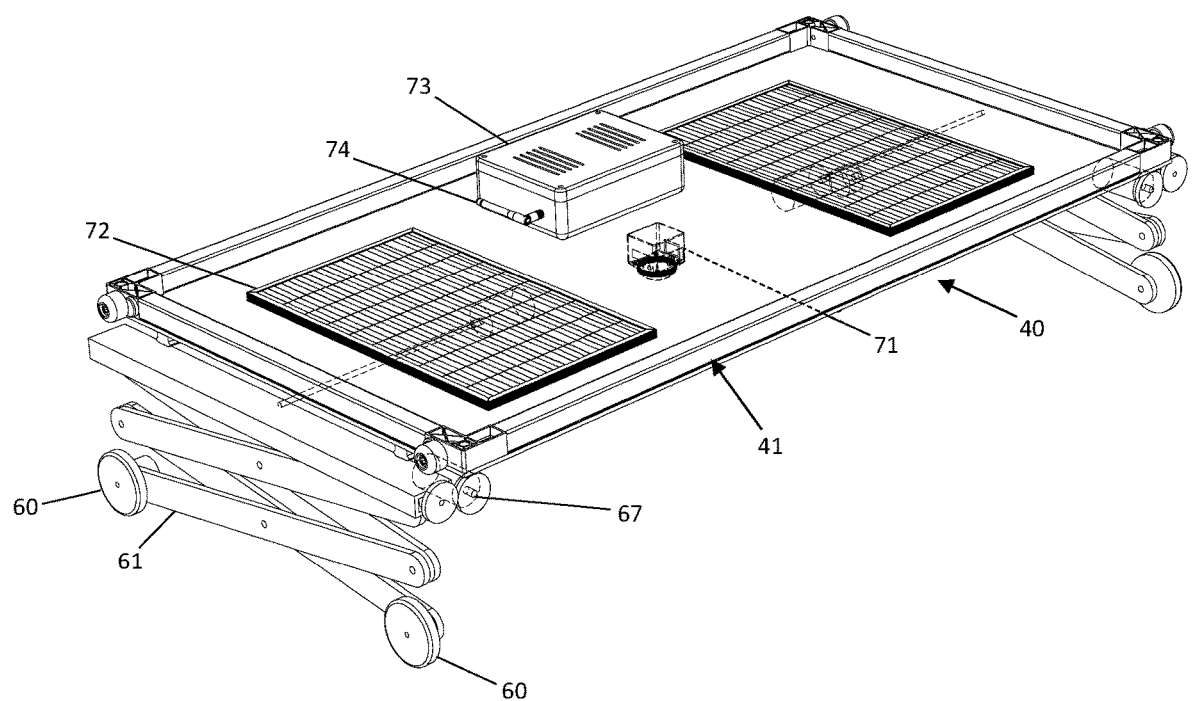
FIG. 7 shows one embodiment of a tray assembly having a sensory and actuated frame insert.

As depicted in FIGS. 3-7, the template frame (41) in one embodiment is compatible with features demonstrated on the manipulator (82) in FIGS. 14 and 15, and also the track assembly (18) of FIGS. 8-10. The template frame (41) comprises a tag (47), which may be but is not limited to RFID, or a binary matrix. Grasping features, such as a flange for a forklift approach, features for vacuum holding, latches, or keys may also be considered. Low-friction bearings (46) nest within the track (19), permitting motion along its length. A template frame (41) serves as a surface for mounting farm peripherals, such materials for cultivating product (FIGS. 3-6), materials for sensing the environment, or materials for actuation (FIG. 7).

Other contemplated embodiments, as shown in FIGS. 3-6, of the frame insert (50) comprise of features such as a deep bin (54) or shallow bin (55) to retain organic matter. A lid (53) may be included to regulate environment within the deep bin (54). Fasteners (44) hold the template frame (41) to the frame insert (50).

Other contemplated embodiments of the template frame (41) comprise features such as solar panels (72) that may provide power to be stored in a battery. In one embodiment depicted in FIG. 7, an electronics enclosure (73) may store power generated from a solar panel (72) and perform sensory and control tasks through the locomotion along a track assembly (18). Wheels (60) may be deployed through active actuation from the assistance of motors (67). A linkage (61) system allows for the height of the template frame (41) to be adjusted. An antenna (74) facilitates wireless communication to a central hub. A camera (71) provides data in the visible, infrared, or ultraviolet spectra.

If not otherwise stated herein, it may be assumed that all components and/or processes described heretofore may, if appropriate, be considered to be useable with or interchangeable with similar components and/or processes disclosed in the following embodiments, unless an express indication is made to the contrary. Similar are corresponding features are identified with references numbers increased by one hundred.

Figure 23:
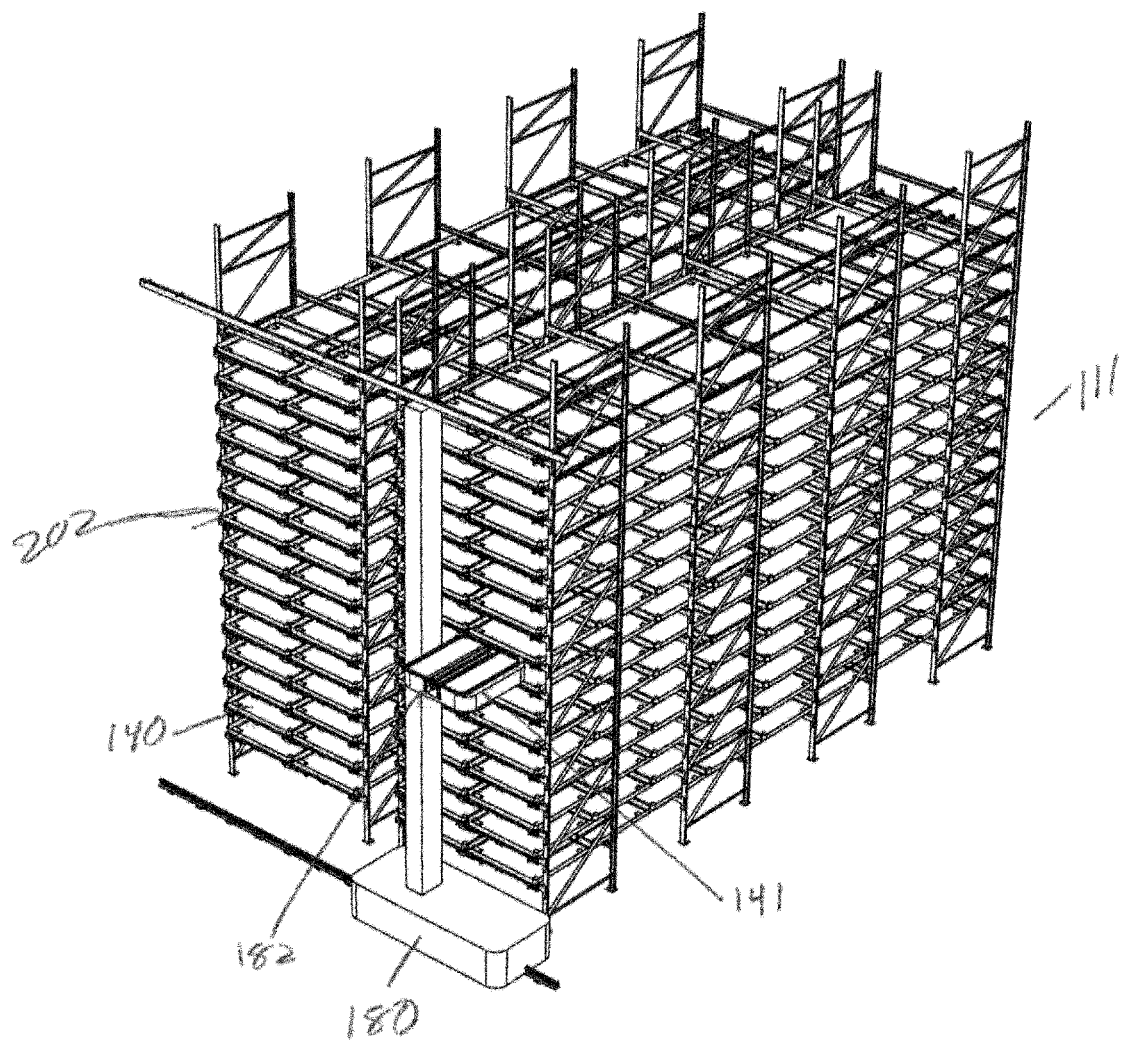
FIG. 23 is a perspective view of a single carriage-mounted manipulator LIFO system operating system.
Figure 24:
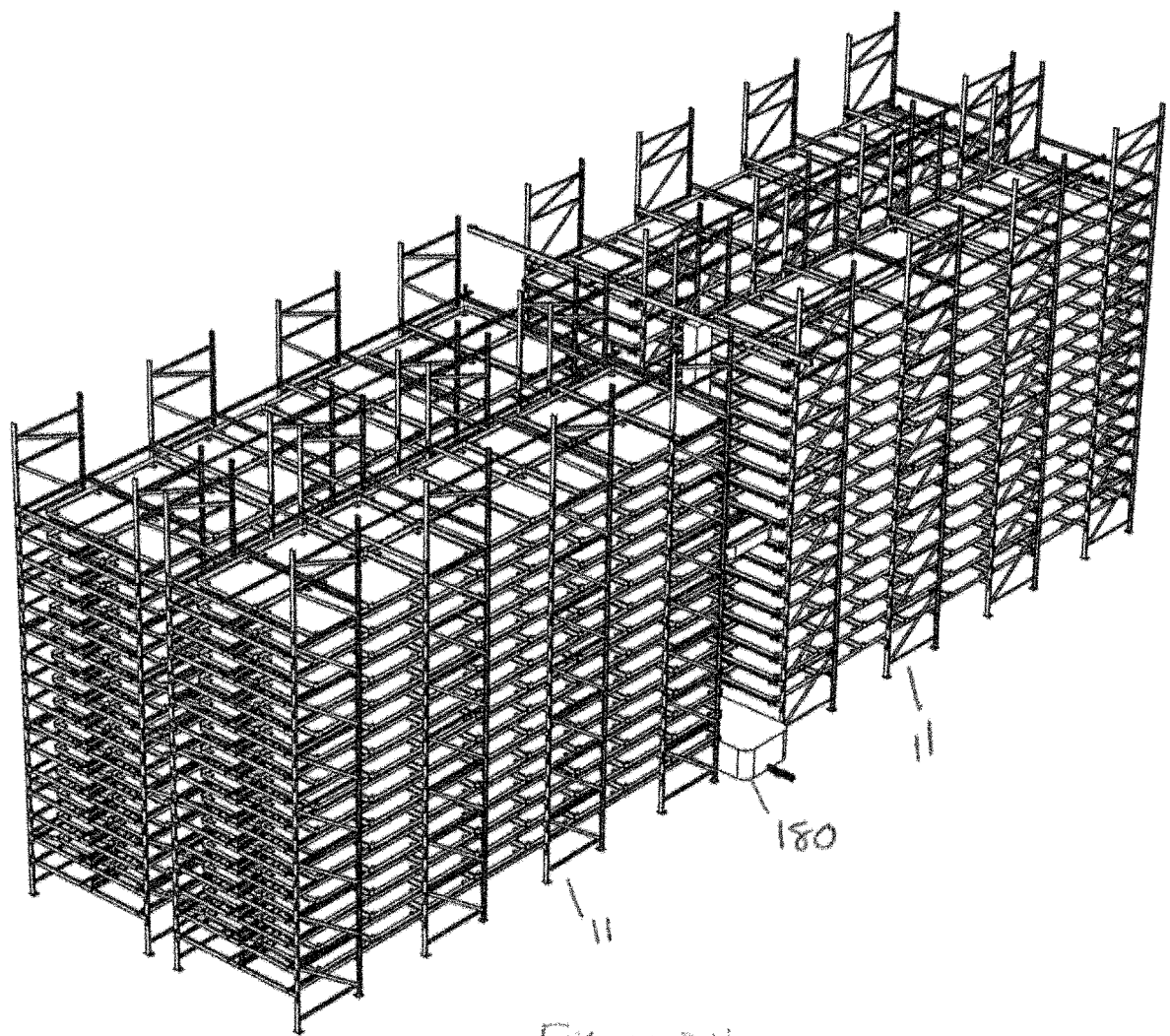
FIG. 24 is a perspective view of a single carriage-mounted manipulator LIFO system operating system having racks on both sides of the manipulator.

While the embodiments shown in FIGS. 1-15 allow for first-in-first-out (FIFO) inventory management, other embodiments, shown in FIGS. 16-26, allow for last-in-first-out (LIFO) inventory management of tray assemblies 140 each having a frame assembly 141. In the embodiments shown in FIGS. 1-15, the inventory management is FIFO because the system includes a pair of coordinated carriage mounted manipulators 82 wherein the first manipulator 82 manipulator which can then unload a the tray assembly 40 from the lane that had been in the lane the longest. The embodiments of FIGS. 16-26 are capable of LIFO without the use of a gravity conveyor because a single manipulator 182 is capable of pulling the last loaded tray assembly 140 off of a lane 200, and in doing so indexes each tray assembly 140 one step rearwards towards the manipulator 182. Referring to FIG. 23, a single manipulator 182 mounted on a carriage 180 is used which provides the same amount of productivity as the above-described embodiments utilizing two manipulators 82 while removing the need to coordinate movements of two manipulators 82. This allows for more consistent grasps by the manipulator 182 and requires fewer movements to access a frame assembly 141. A friction based staging area may also be provided.

Figure 19:
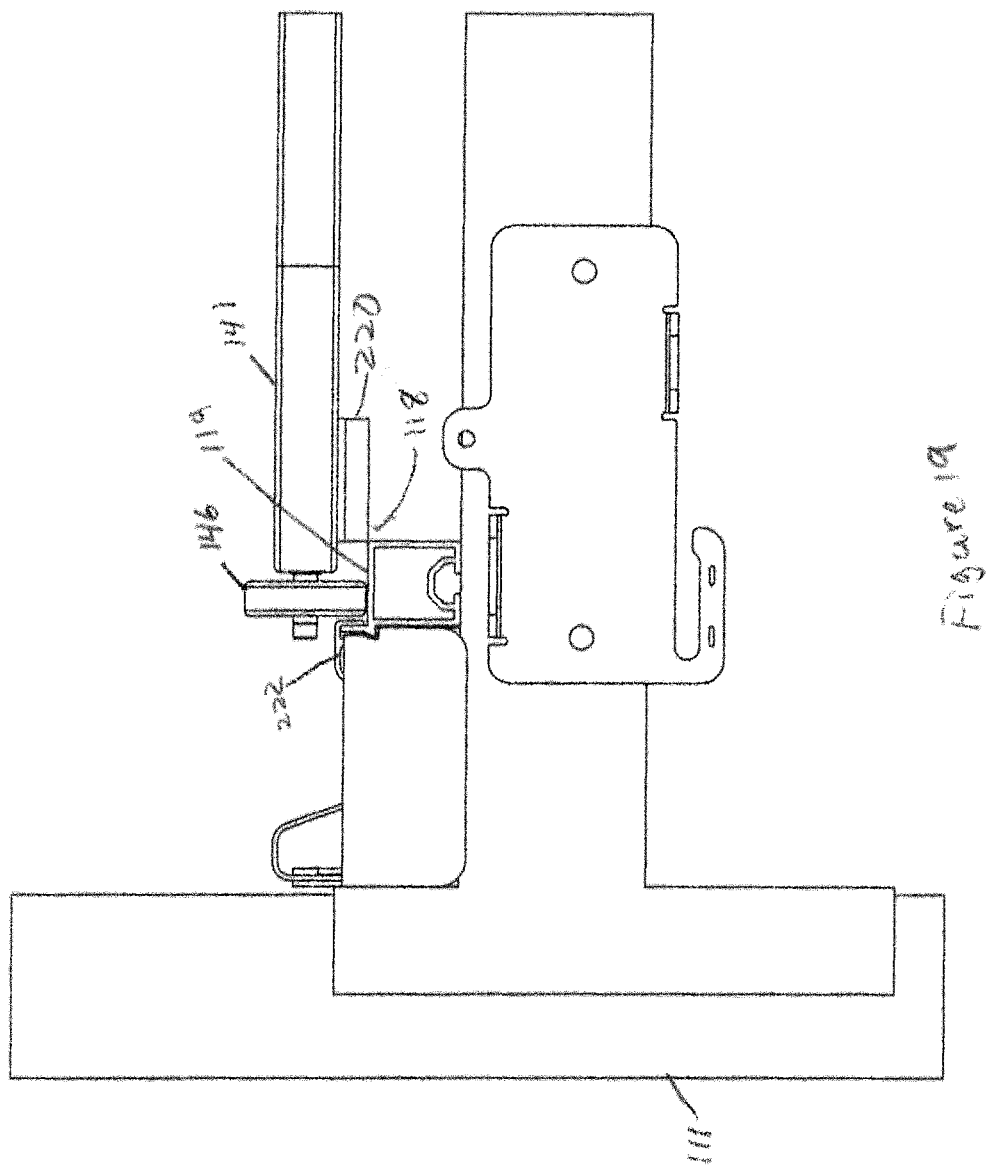
FIG. 19 is a detailed view of a frame assembly positioned on a friction surface.
Figure 20:
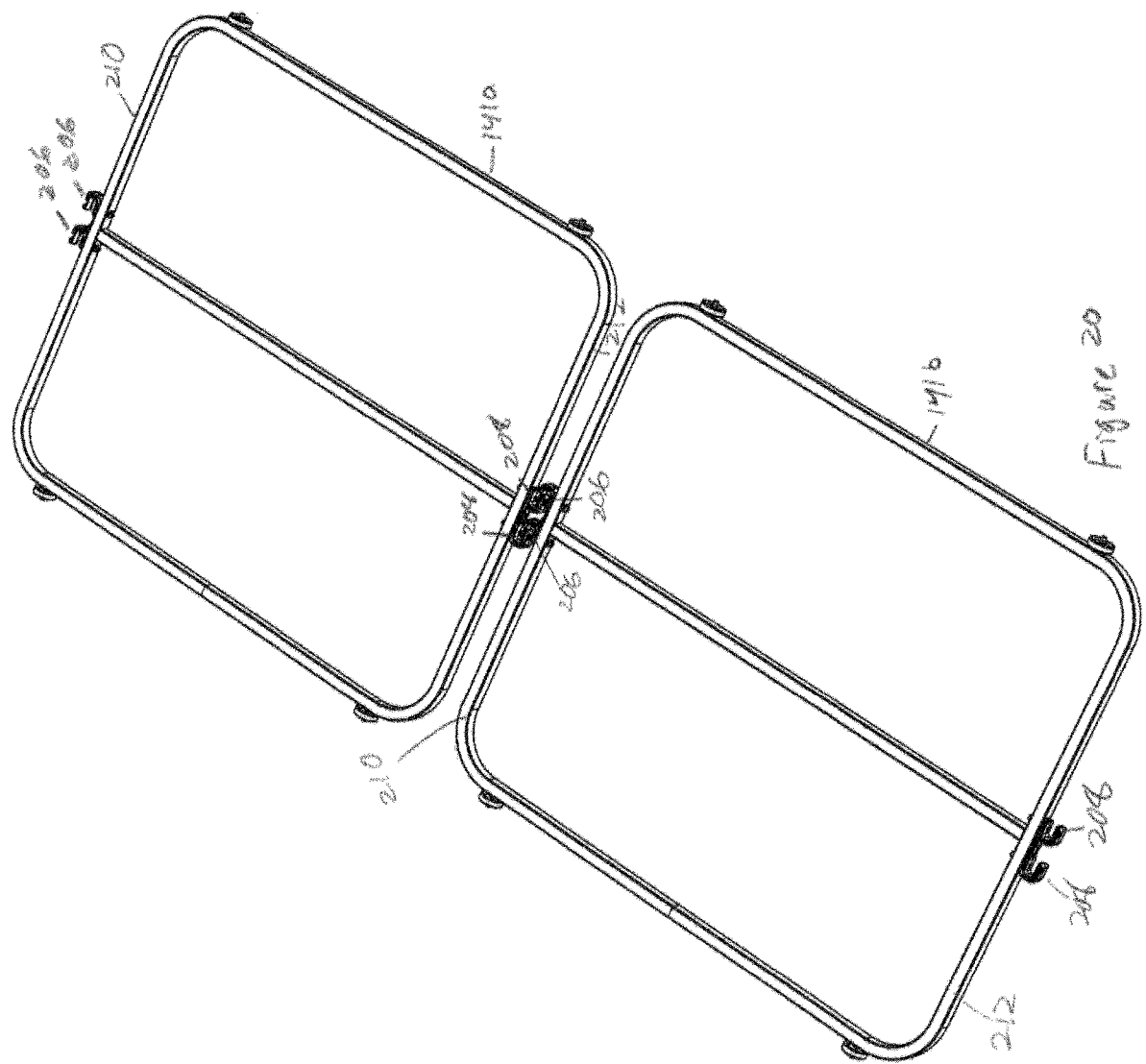
FIG. 20 is a perspective view of two frame assemblies coupled together.
Figure 21:
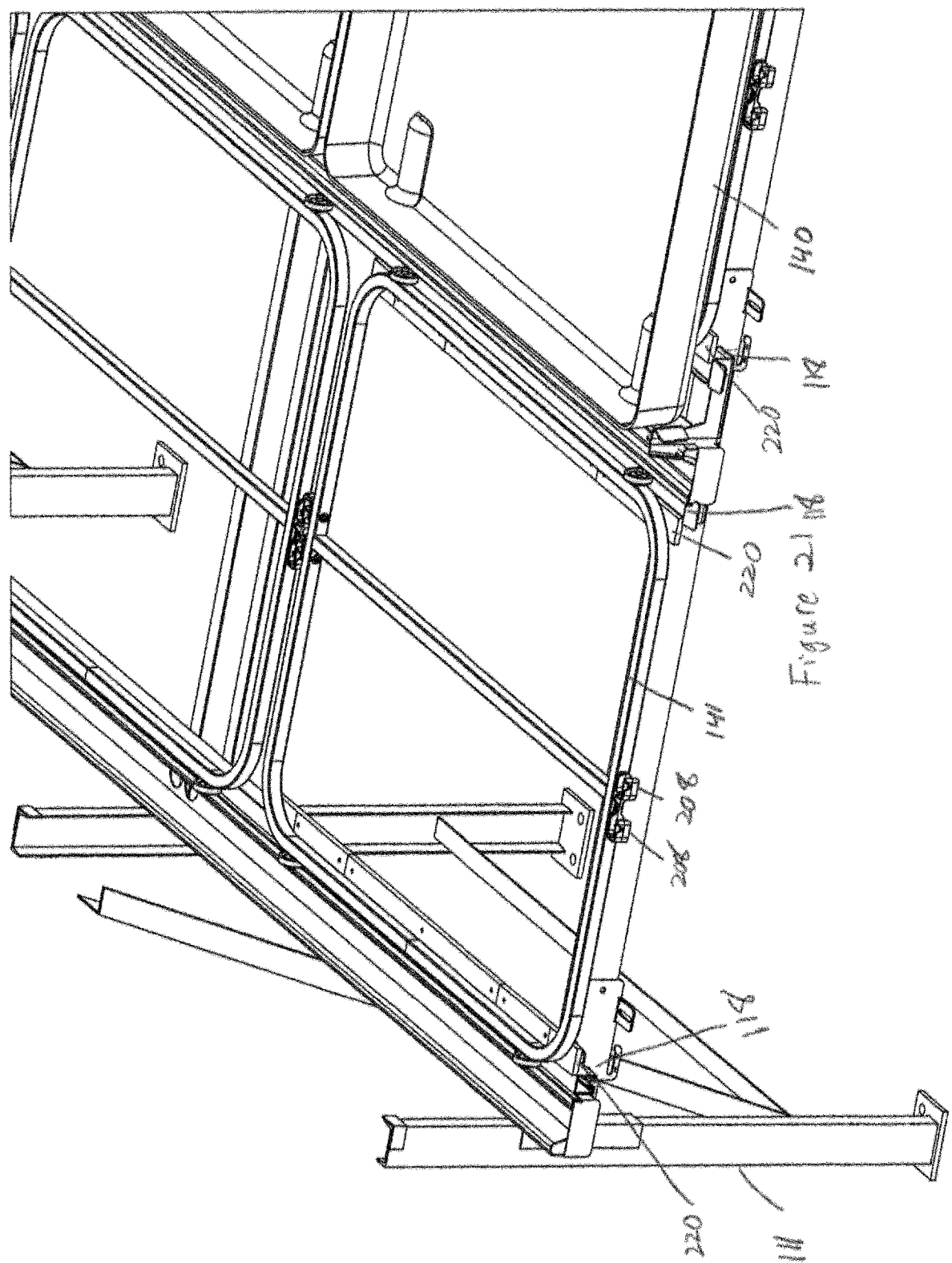
FIG. 21 is a detailed view of frame assemblies on a rack.
Figure 22:
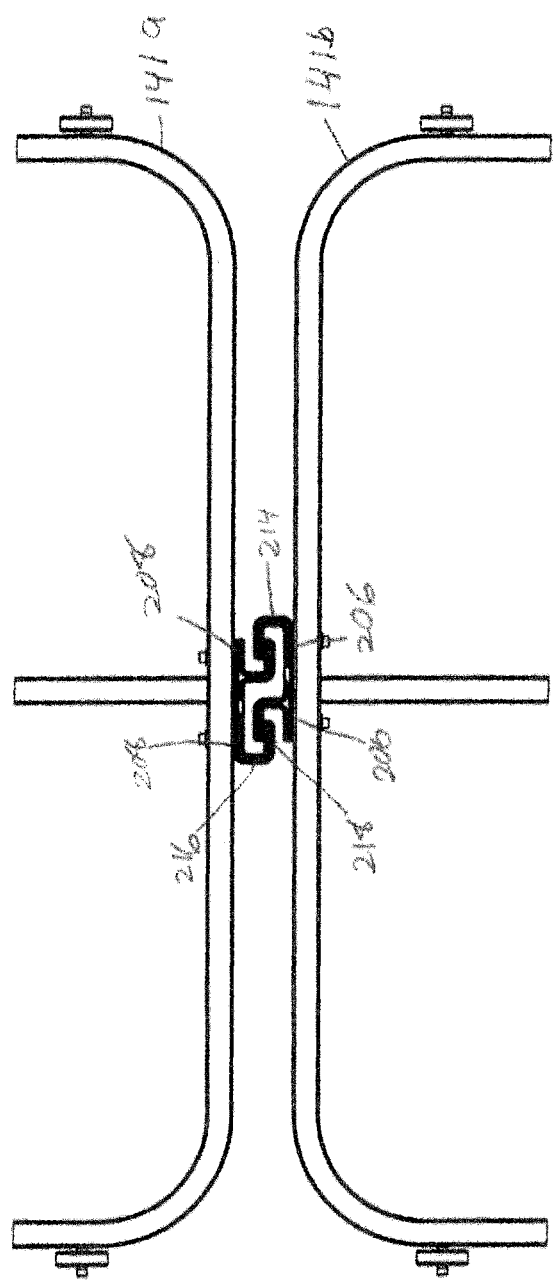
FIG. 22 is a detailed view of two frame assemblies coupled together.

Referring to FIGS. 16-26, frame assemblies 141 are slidable forwardly and rearwardly in long track assemblies 118 along a forward and rearward direction of travel within a plurality of horizontal lanes 200 arranged in a plurality of vertical columns 202 in rack 111. Like in the above-described embodiments, each frame assembly 141 includes stiffeners 142 and low-friction bearings 146 rollable on tracks 119 of a track assembly 118 to move the frame assembly 141 in the forward and rearward direction of travel X. As shown in FIG. 19, frame assembly 141 is configured to move on a track assembly 118 that is secured to rack 111. Frame assembly 141 bears directly onto a friction surface 220 incorporated into the track assembly 118. The friction surface 220 exerts countering forces overcome linear motion that is normally facilitated by the low-friction bearing 146 on the track 119. The static forces produced by the friction surface facilitate the precise positioning of the frame assembly 141 then being placed and retrieved by a carriage-mounted manipulator 182. A guard 222 prevent linear displacement of the frame assemblies 141. Alternatively, tracks 119 may include wheels 204 on which the frame assemblies 141 slide upon.

Each frame assembly 141 in each horizontal lane 200 is configured to couple to an adjacent frame assembly 141. Each frame assembly 141 has at least one coupler 206, 208 on the forward and rearward ends 210, 212 of the tray assembly. In the embodiment shown in FIGS. 16-24, the at least one coupler 206 on the forward end 210 are first and second forward couplers 206, and the at least one coupler 208 on the rearward end 112 are first and second rearward couplers 208. In this embodiment, the first and second forward couplers 206 and the first and second rearward couplers 208 are a pair of spaced hook shaped components 214 each having a first proximal portion 216 substantially perpendicular to the respective end 210, 212 of the frame assembly 141 and substantially parallel to the direction of travel X, and a distal portion 218 substantially perpendicular to the forward and rearward direction of travel X and parallel to the corresponding end 212, 214 of the frame assembly 141. Each pair of the first and second forward couplers 206 on a frame assembly 141 is configured to couple with the first and second rearward couplers 208 of an adjacent frame assembly 141 in the forward direction of travel. In order to couple with adjacent frame assemblies 141, the second distal portion 218 of each first and second forward couplers 206 extends in the opposite direction to the second distal portions 218 of the first and second rearward couplers 208 of an adjacent tray assembly such that each frame assembly 141 is rotationally symmetrical about an axis normal to the width and length frame assembly plane. This rotational symmetry allows for bidirectional operation of the manipulator 182 and allows for frame assemblies 141 to be placed anywhere without the need to rotate the frame assembly 141. Other forms of couplers and arrangements are acceptable. For example, having multiple coupling features; having a positive engagement latch or drop pin, as commonly found in gates and train cars; dropping a tray assembly onto a hitch; powerful magnets; engagement of a cam or key feature; fastening and unfastening with screws; no coupler, instead a gravity flow rack and a sufficiently powerful manipulator to overcome increased indexing loads. The manipulator would then be configured to correspond to the coupler to allow for coupling and decoupling.

The couplers 206, 208 may be integral with the frame assembly 141 of each tray assembly 140 material and be made from a corrosion-resistant cast low carbon steel, aluminum, or stainless steel. They may also be made from aluminum extrusions, formed heavy gauge steel, aluminum, or stainless sheets, formed stainless wire, or subtractively or additively manufactured metal. The couplers 206, 208 may also be attached to stiffeners 142 of the frame assembly 141.

The forward and rearward couplers 206, 208 are the features that the manipulator 182 uses to couple, push, and pull the frame assemblies 141. Because the carriage-mounted manipulator 182 positions itself spatially to a plus or minus tolerance from nominal, it is best for the first and second forward and rearward couplers 206, 208 to be oversized in accordance with tolerances expected from the carriage-mounted manipulator 182. This ensures that a manipulator 182 positioned "slightly off" can still couple to a coupler 206, 208 without the need for sophisticated actuation or sensing. Because the coupler 206, 208 is oversized in this way, there exists a small (about 0.25") amount of linear play from one coupler 206, 208 engaged to another.

According to an embodiment, a first frame assembly 141*a* being added to a lane 200 is coupled to second frame assembly 141*b* on the lane 200 as follows:
1. The carriage-mounted manipulator 182 engages to the first frame assembly 141*a* and positions the first and second forward couplers 206 on the first frame assembly 141*a* above the first and second rearward couplers 208 of the second frame assembly 141*b*.
2. Manipulator 182 lowers the first frame assembly 141*a* (for example, a few inches) such that the first and second forward couplers 206 on the first frame assembly 141*a* slide into the first and second rearward couplers 208 of the second frame assembly 141*b*.
3. The first frame assembly 141*a* is now coupled to the second frame assembly 141*b* in the direction of travel X of the lane 200 with the couplers 206 and 208 being coplanar a configured to transmit force in the direction of travel X.
4. The manipulator 182 may push the first frame assembly 141*a* towards the second frame assembly 141*b* and index the series of interconnected frame assemblies 141*a*, 141*b* one index.
5. Manipulator 182 disengages from the first frame assembly 141*a*.

According to an embodiment, a first frame assembly 141*a* is decoupled from a second frame assembly 141*b* on the lane as follows:
1. Manipulator 182 engages to the first frame assembly 141*a*.
2. Manipulator 182 pulls the first frame assembly 141*a*, subsequent frame assemblies 141 are pulled towards the manipulator 182 one index. The first frame assembly 141*a* is now secured by the manipulator 182.
3. Manipulator 182 raises the first frame assembly 141*a* (for example, a few inches) such that the first and second forward couplers 206 of the first frame assembly 141*a* slide from the first and second rearward couplers 208 of the second frame assembly 141*b*.
4. The first frame assembly 141*a* is now decoupled from the second frame assembly 141*b* in the direction of travel.

Figure 25:
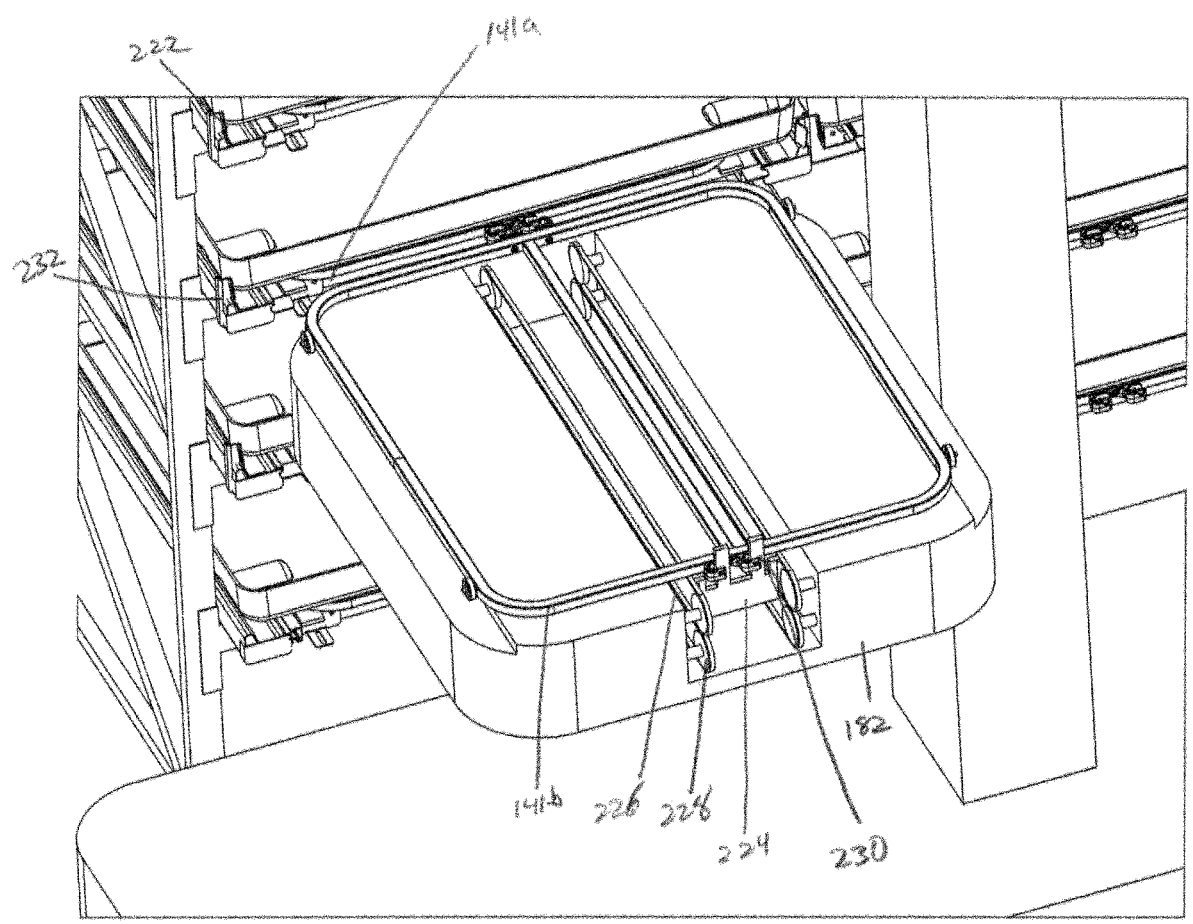
FIG. 25 is a detailed view of a frame assembly secured by a manipulator.
Figure 26:
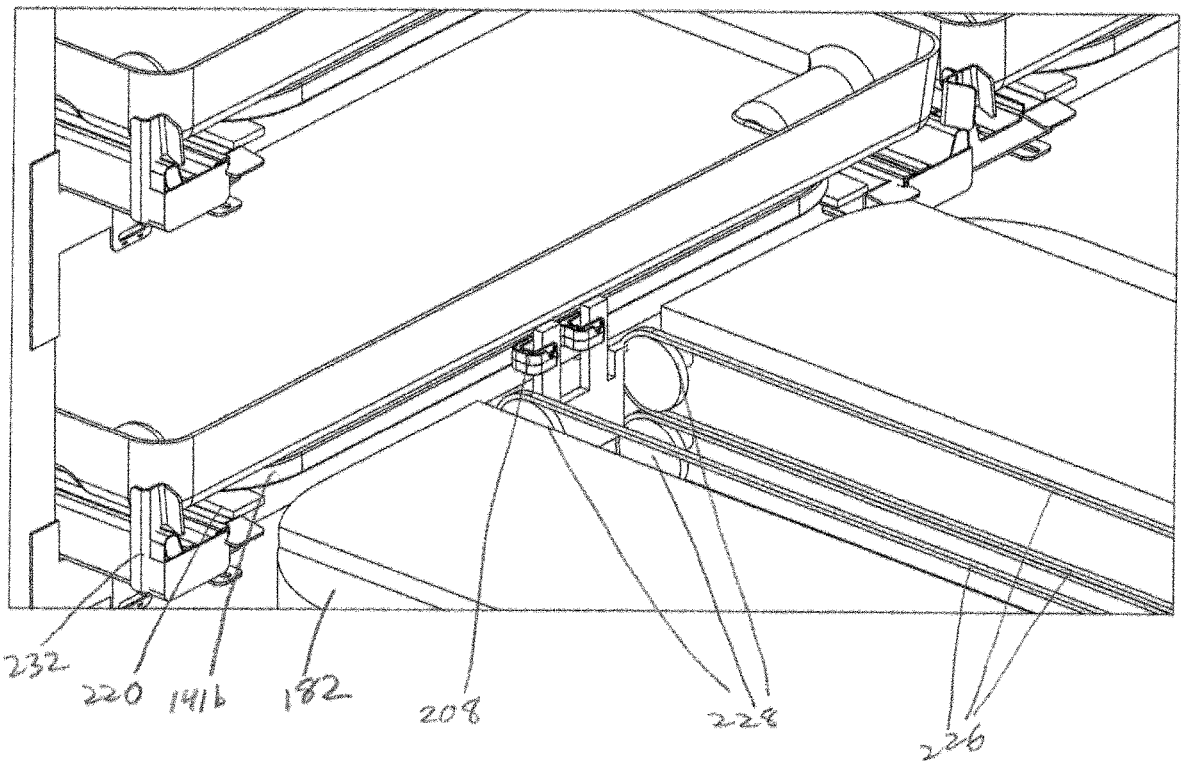
FIG. 26 is a detailed view of an engagement thumb of a manipulator connected to a frame assembly coupler.

Referring to FIGS. 25 and 26, an engagement thumb 224 having projections 230 for connecting to a coupler 208 on a frame assembly 141 fixedly connects to a parallel-driven belts 226. Pulleys 228 driven clockwise or anticlockwise, are used to provide transmission to the belts 226, which power and guide linear motion of the engagement thumb 224 in the direction of travel X as dictated by the track assembly 118. Bi-directional motion of the engagement thumb 224 is possible, allowing for manipulation paradigms to both available sides of the manipulator 182.

As illustrated in FIG. 26, to grasp a frame assembly 141*b* positioned first-out of the track assembly 118, the carriage-mounted manipulator 182 is fixed near the frame assembly 141 with the engagement thumb 224 positioned below the coupler 208 to be manipulated. The pulleys 228 provide power to the belts 226, which motions vertical movement of the engagement thumb 224 to slide into the coupler 206 and engage. The pulleys 228 continue to drive as the motion of the engagement thumb 224 transitions from vertical movement to horizontal, pulling the first-out frame assembly 141*b* and all subsequently coupled frame assemblies 141 along the same track assembly 118 a distance of one index. With the frame assembly 141*b* secured aboard the manipulator 182, the manipulator 182 moves vertically to disengage the coupler 208 of the secured frame assembly 141 from the newly positioned first-out frame assembly 141*a*, if present.

To place a frame assembly 141, the carriage-mounted manipulator 182 is positioned near the track assembly 118 of interest. As is shown in FIG. 25, the manipulator 182 is oriented vertically to engage the coupler 208 of the secured frame assembly 141*a* to the coupler 206 of the first-in frame assembly 141*b* within a track assembly 118. The engagement thumb 224, in contact to the coupler 208 of the secured frame assembly 141*a* in the direction of the first-in frame assembly 141*b*, is powered through the input of the pulley 228 and belt 226 drive system. Compressive force is exerted from the engagement thumb 224 and through the secured frame assembly 141*a*, causing motion of the secured frame assembly towards the rack 111.

A guide 232 is used to center the frame assembly 141*b* during ingress, and guards 222 are used to center the frame assembly 141*b* along the length of the track assembly 118. Subsequent frame assemblies 141 within the track assembly 118, if present, move one full index. The manipulator 182 disengages its engagement thumb 224 from the newly-positioned first-out frame assembly 141, and the motion is complete.

Like in the above-described embodiments, the embodiment of FIGS. 16-24, may also use identifying tags 147 such as an RFID chip or optical feature allowing for tracking from an inventory management system According to the embodiment of FIGS. 16-24, a lane 200 containing frame assemblies 141 may be completely emptied by a single manipulator 182, easing manual functions around cleaning and inspecting farm equipment. It is to be understood that the disclosed embodiments are not limited to the farming industry but may be utilized in other autonomous material handling industries such as food and fulfillment operations.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An apparatus for autonomous controlled environment agriculture comprising:
    a first rack;
    at least one track assembly fixedly connected to the first rack;
    a plurality of tray assemblies wherein each of the tray assemblies is movably supported by at least one track assembly, and is configured to be coupled to an adjacent tray assembly by at least one coupler disposed on at least a forward end and a rearward end of each tray assembly;
    at least one fluid emitter configured to deliver a fluid to the tray assemblies;
    at least one drain configured to evacuate the fluid from the tray assemblies;
    a carriage moveable relative to the first rack; and
    a manipulator operably connected to the carriage and configured to add a first one of said tray assemblies to said at least one track assembly by coupling said first tray assembly to a second one of said tray assemblies on said at least one track, and configured to retrieve a first one of said tray assemblies on said track assembly by decoupling said first tray assembly from a second one of said tray assemblies on said track;
    wherein the at least one coupler on adjacent tray assemblies are configured the same, and each tray assembly is rotationally symmetrical about an axis normal to a horizontal plane defined by a width and a length of the tray assembly.

2. The apparatus of claim 1, wherein the at least one coupler comprises at least one hook shaped component each having a first proximal portion substantially perpendicular to the forward and rearward ends of the tray assembly and a second distal portion substantially parallel to the forward and rearward ends of the tray assembly.

3. The apparatus of claim 2, wherein the second distal portion of an at least one coupler on the rearward end of each tray assembly extends from the first proximal portion of the at least one coupler on the rearward end of each tray assembly in a direction opposite to a direction a second distal portion of an at least one coupler on the foreword end of the tray assembly extends from a first proximal portion of an at least one coupler on the foreword end of the tray assembly.

4. The apparatus of claim 1, wherein each tray assembly comprises a tray operatively connected to a frame assembly.

5. The apparatus of claim 4, wherein the at least one track assembly further comprises a friction surface portion configured to support the frame assembly of a first tray assembly disposed in a position retrievable by the manipulator and further configured to overcome linear motion linear motion of the first tray assembly on the at least one track assembly.

6. The apparatus of claim 1, wherein the manipulator comprises at least one engagement thumb configured to interact with the at least one coupler on the rearward end of a first one of said tray assemblies.

7. The apparatus of claim 6, wherein the at least one engagement thumb is configured for bi-directional motion on the manipulator.

8. The apparatus of claim 1, further comprising a second rack having at least one track assembly fixedly connected thereto, wherein the manipulator is positioned between the first rack and the second rack and configured to retrieve tray assemblies from the first rack and the second rack.

9. A method of autonomous controlled environment agriculture comprising:
    delivering a fluid to a plurality of tray assemblies;
    evacuating the fluid from the plurality tray assemblies through at least one drain;
    engaging a first tray assembly of the plurality of tray assemblies with a manipulator, wherein the first tray assembly has at least one forward coupler on a forward end of the first tray assembly;
    positioning the at least one forward coupler on the first tray assembly above at least one rearward coupler on a rearward end of a second tray assembly of the plurality of tray assemblies disposed on a track assembly of a rack, wherein the at least one forward coupler and the at least one rearward coupler on adjacent tray assemblies are configured the same, and each tray assembly is rotationally symmetrical about an axis normal to a horizontal plane defined by a width and a length of the tray assembly;
    lowering the first tray assembly such the at least one forward coupler on the first tray assembly slides into the at least one rearward coupler on the rearward end of the second tray assembly.

10. A method of autonomous controlled environment agriculture comprising:
    delivering a fluid to a plurality of tray assemblies;
    evacuating the fluid from the plurality tray assemblies through at least one drain;
    engaging a first tray assembly of the plurality of tray assemblies disposed on a track assembly of a rack with a manipulator, wherein the first tray assembly has at least one forward coupler on a forward end of the first tray assembly;
    positioning the first tray assembly to disengage the at least one forward coupler from at least one rearward coupler on a rearward end of a second tray assembly of the plurality of tray assemblies disposed on the track assembly, wherein the at least one forward coupler and the at least one rearward coupler on adjacent tray assemblies are configured the same, and each tray assembly is rotationally symmetrical about an axis normal to a horizontal plane defined by a width and a length of the tray assembly.

11. A method of autonomous controlled environment agriculture comprising:
    delivering a fluid to a plurality of tray assemblies;
    evacuating the fluid from the plurality tray assemblies through at least one drain;

engaging a first tray assembly of the plurality of tray assemblies with a manipulator, wherein the first tray assembly is disposed on a first position on a track assembly of a first rack and coupled to a second tray assembly of the plurality of tray assemblies disposed on a second position on the track assembly, wherein the first tray assembly has at least one forward coupler on a forward end of the first tray assembly, and the second tray assembly has at least one rearward coupler on a rearward end of the second tray assembly, wherein the at least one forward coupler on the first tray assembly and the at least one rearward coupler on the second tray assembly are configured to couple the first tray assembly and the second tray assembly, wherein the at least one forward coupler and the at least one rearward coupler on adjacent tray assemblies are configured the same, and each tray assembly is rotationally symmetrical about an axis normal to a horizontal plane defined by a width and a length of the tray assembly;

moving the first tray assembly with the manipulator off the first position on the track towards the manipulator;

moving the second tray assembly with the first tray assembly towards the manipulator to occupy the first position on the track assembly;

disengaging the at least one forward coupler on the first tray assembly and the at least one rearward coupler on the second tray assembly.

12. The method of claim 11, further comprising exerting countering forces overcoming linear motion on one of the first tray assembly and the second tray assembly when occupying the first position on the track assembly.

13. The method of claim 11, further comprising a second rack having at least one track assembly fixedly connected thereto, positioning the manipulator between the first rack and the second rack and retrieving tray assemblies from the first rack and the second rack with the manipulator.

14. The method of claim 11, wherein moving the first tray assembly with the manipulator comprises interacting an engagement thumb disposed on the manipulator with an at least one rearward coupler on a rearward end of the first tray assembly.

15. A method of autonomous controlled environment agriculture comprising:

delivering a fluid to a plurality of tray assemblies;

evacuating the fluid from the plurality tray assemblies through at least one drain;

coupling a first tray assembly of the plurality of tray assemblies to a second tray assembly of the plurality of tray assemblies with a manipulator coupled to the first tray assembly, wherein the second tray assembly is disposed on a first position on a track assembly of a first rack, wherein the first tray assembly has at least one forward coupler on a forward end of the first tray assembly and at least one rearward coupler on a rear end of the first tray assembly, and the second tray assembly has at least one rearward coupler on a rearward end of the second tray assembly, wherein the at least one forward coupler on the first tray assembly and the at least one rearward coupler on the second tray assembly are configured to couple the first tray assembly and the second tray assembly, and wherein the at least one rearward coupler on the first tray assembly is configured to couple to the manipulator, wherein the at least one forward coupler and the at least one rearward coupler on adjacent tray assemblies are configured the same, and each tray assembly is rotationally symmetrical about an axis normal to a horizontal plane defined by a width and a length of the tray assembly;

moving the first tray assembly with the manipulator to the first position on the track towards the manipulator;

moving the second tray assembly with the first tray assembly away from the manipulator off of the first position on the track assembly;

disengaging the at least one rearward coupler on the first tray assembly and the manipulator.

\* \* \* \* \*